July 9, 1935.  W. T. CARNES  2,007,638
AUTOMATIC PHONOGRAPH
Filed Oct. 17, 1928   14 Sheets-Sheet 1

July 9, 1935.  W. T. CARNES  2,007,638
AUTOMATIC PHONOGRAPH
Filed Oct. 17, 1928  14 Sheets-Sheet 2
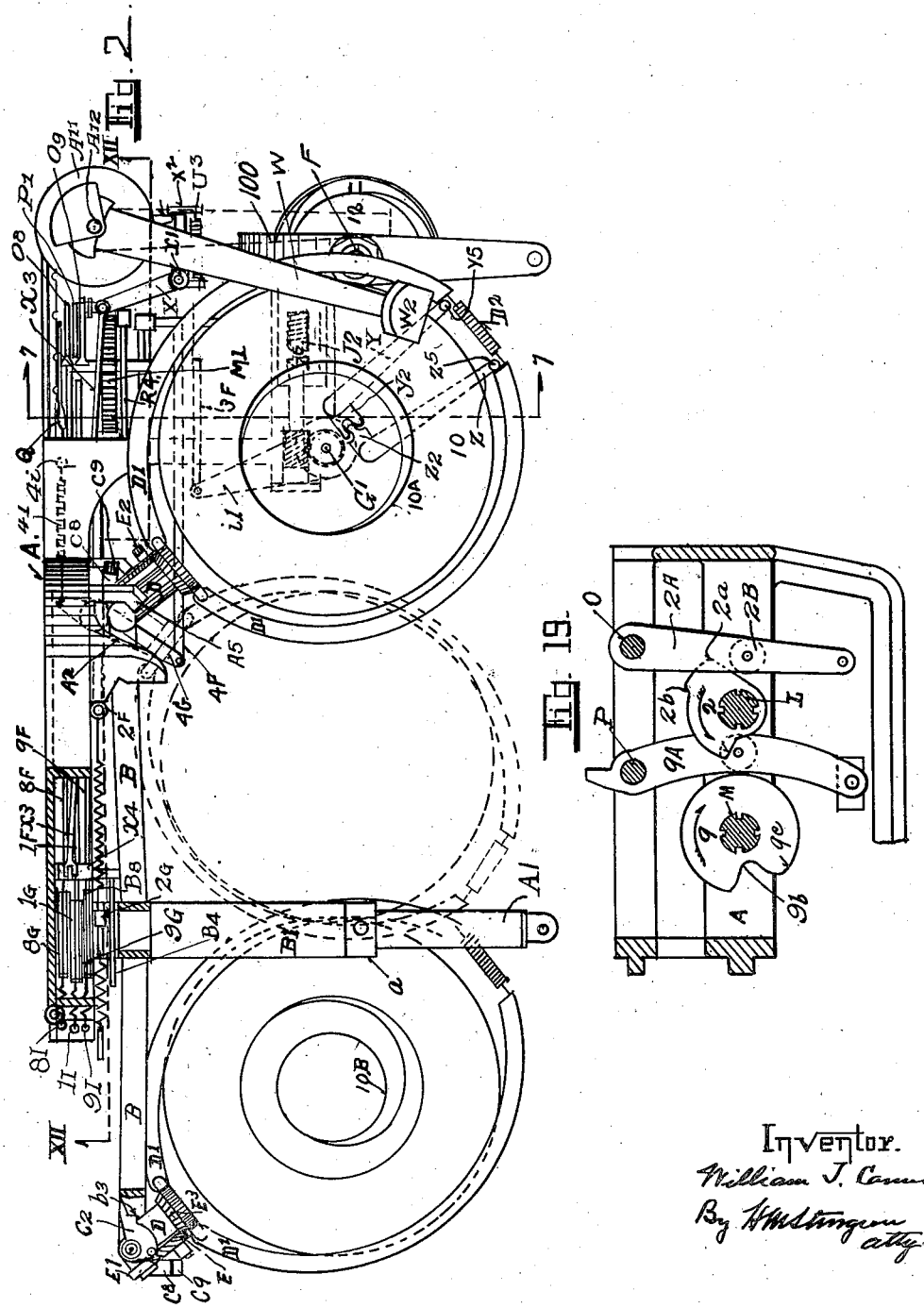
Inventor.
William J. Carnes
By H. M. Stingen
atty

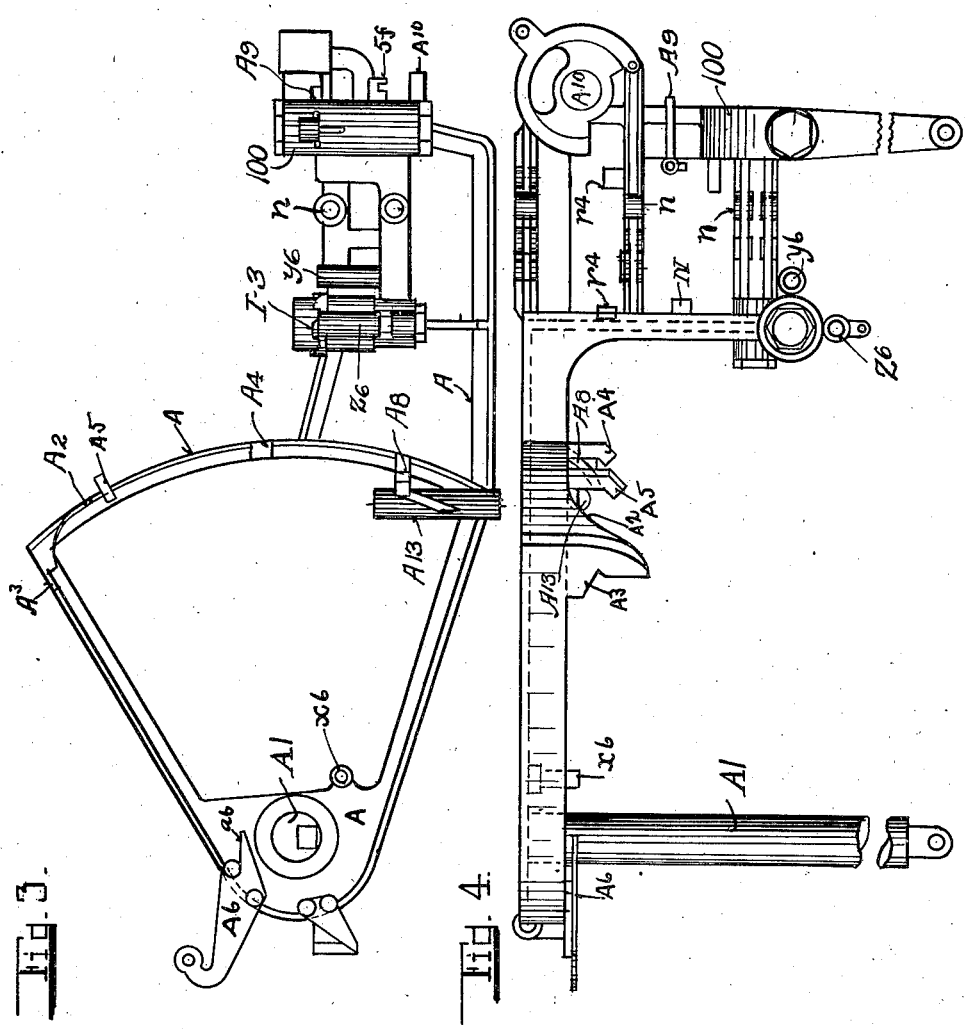

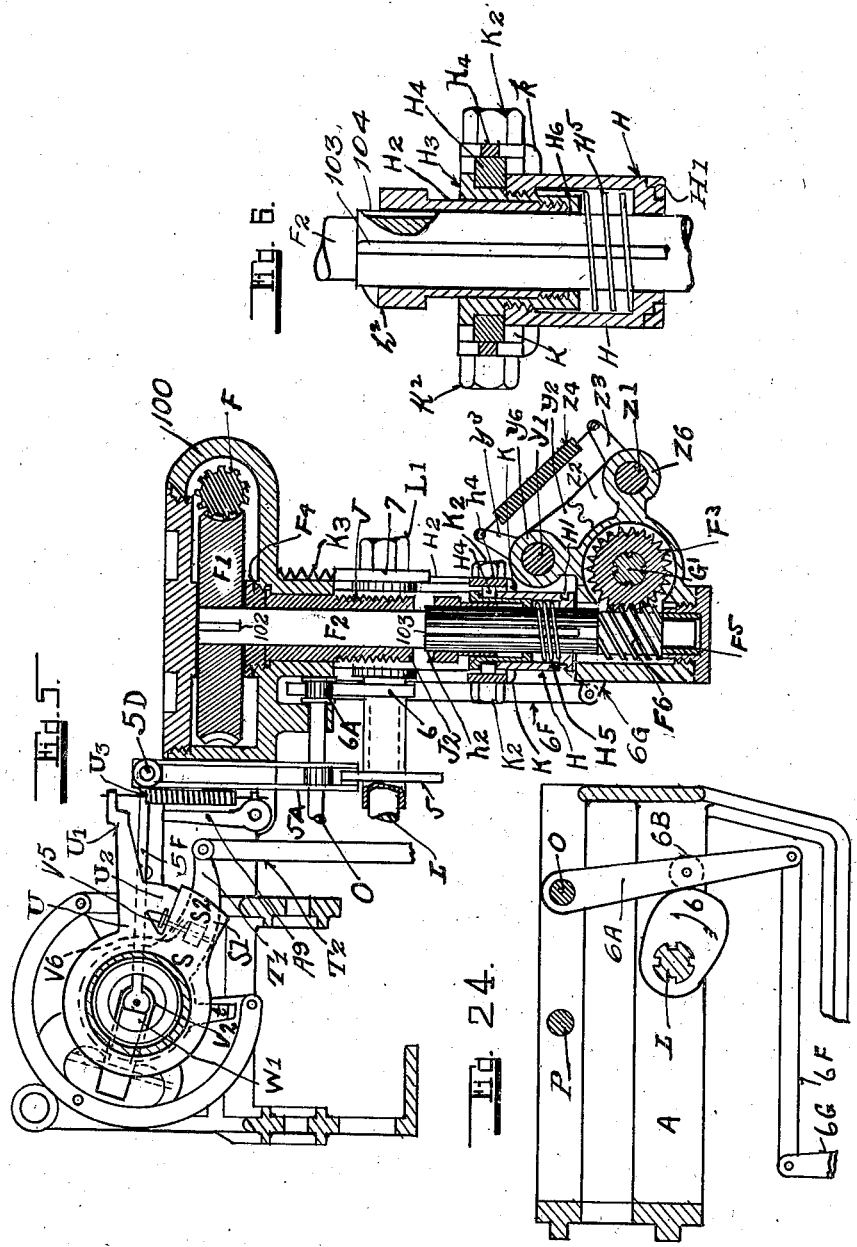

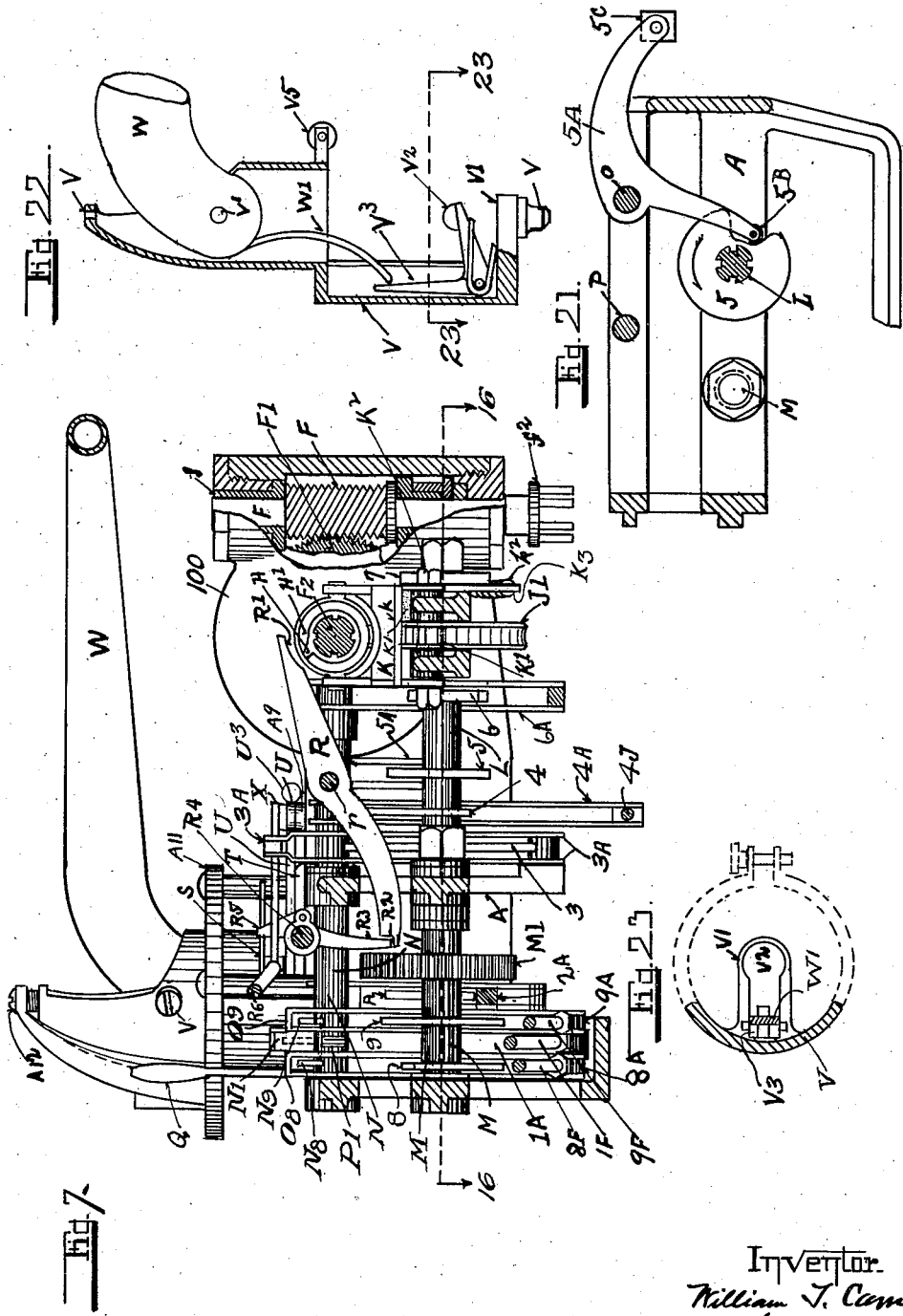

July 9, 1935.  W. T. CARNES  2,007,638
AUTOMATIC PHONOGRAPH
Filed Oct. 17, 1928   14 Sheets-Sheet 6
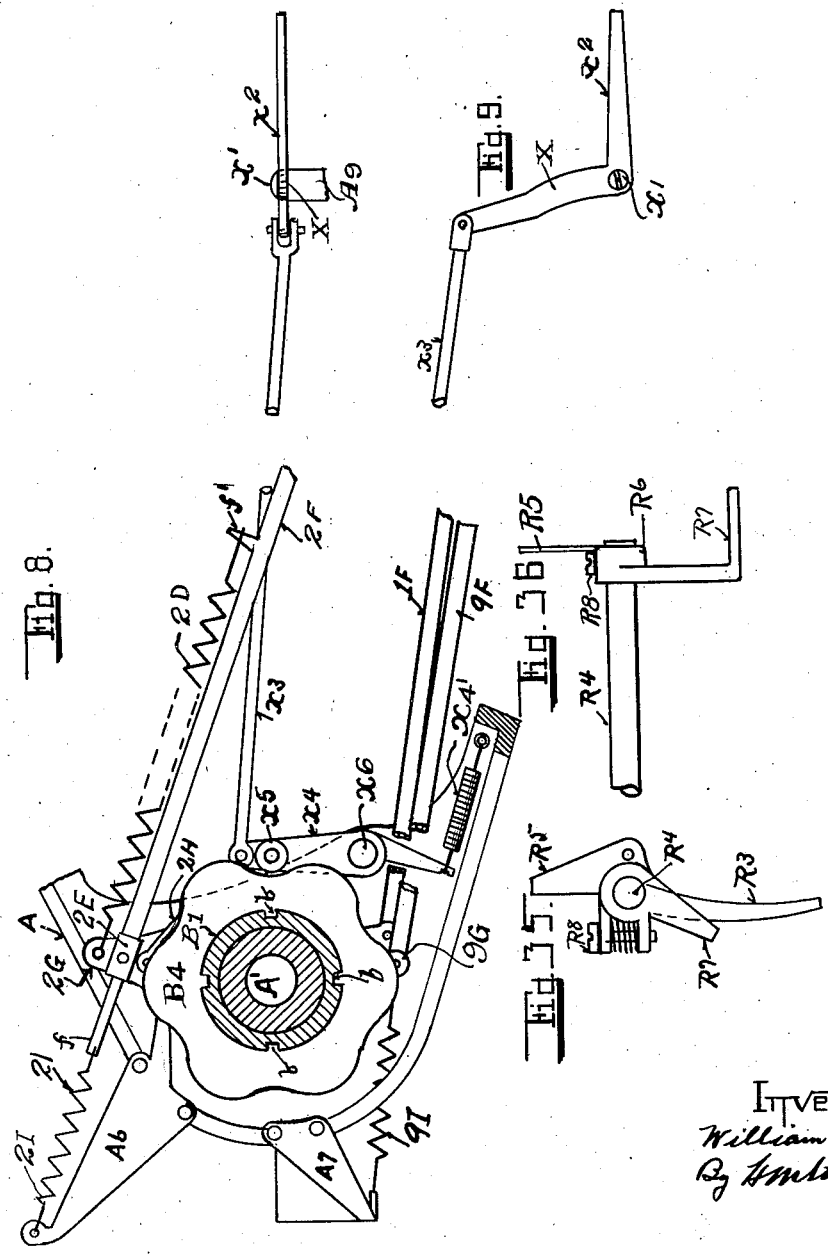

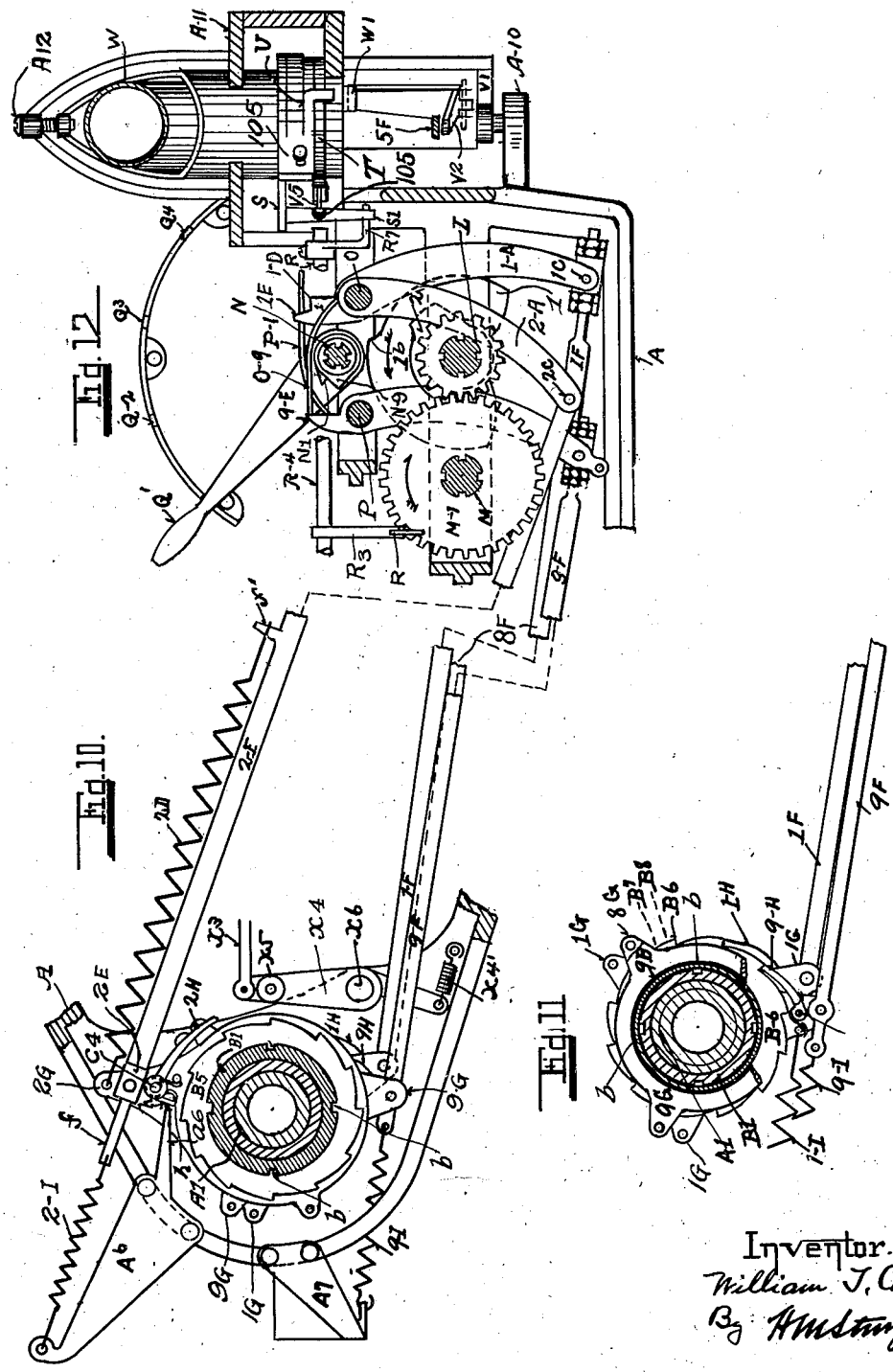

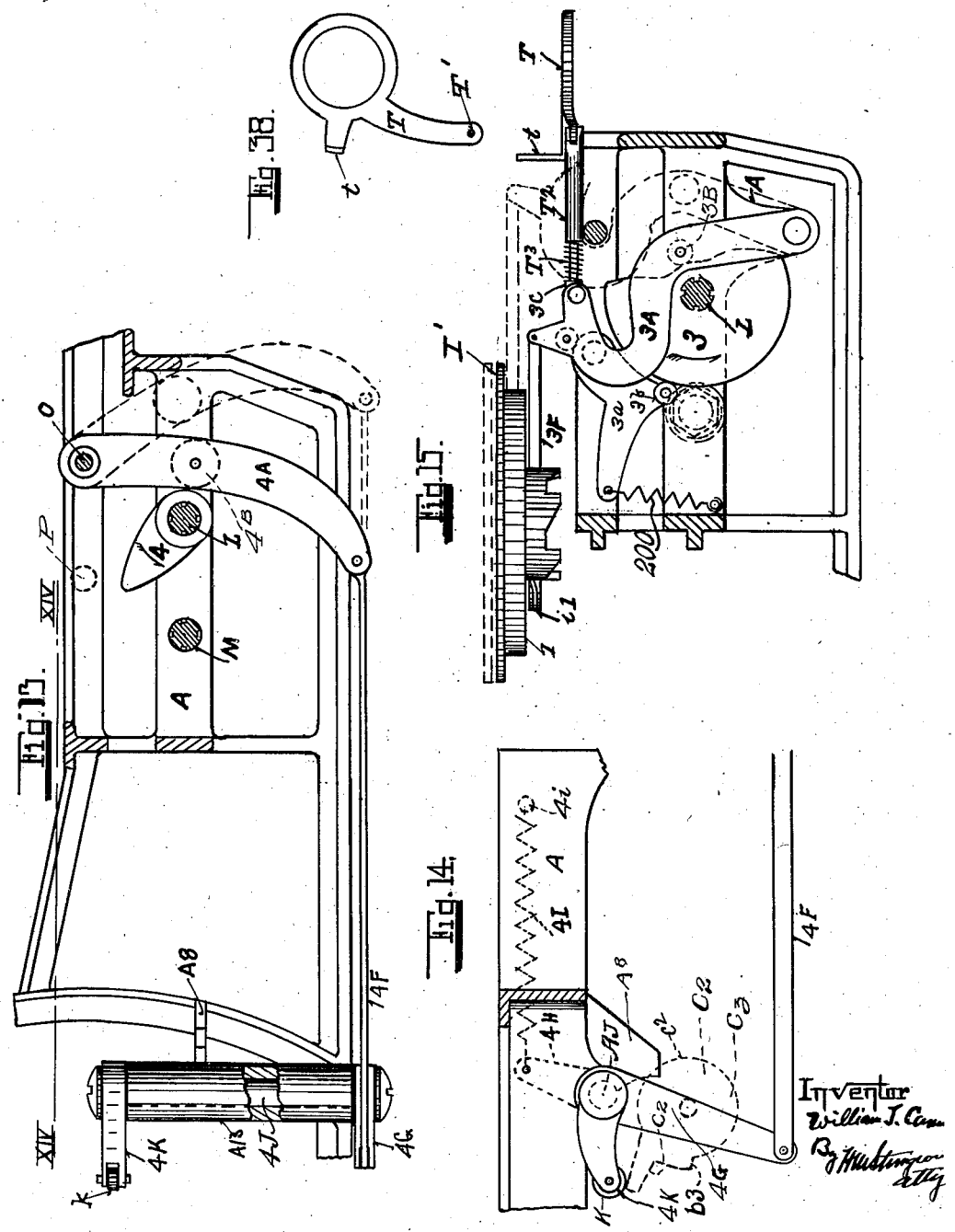

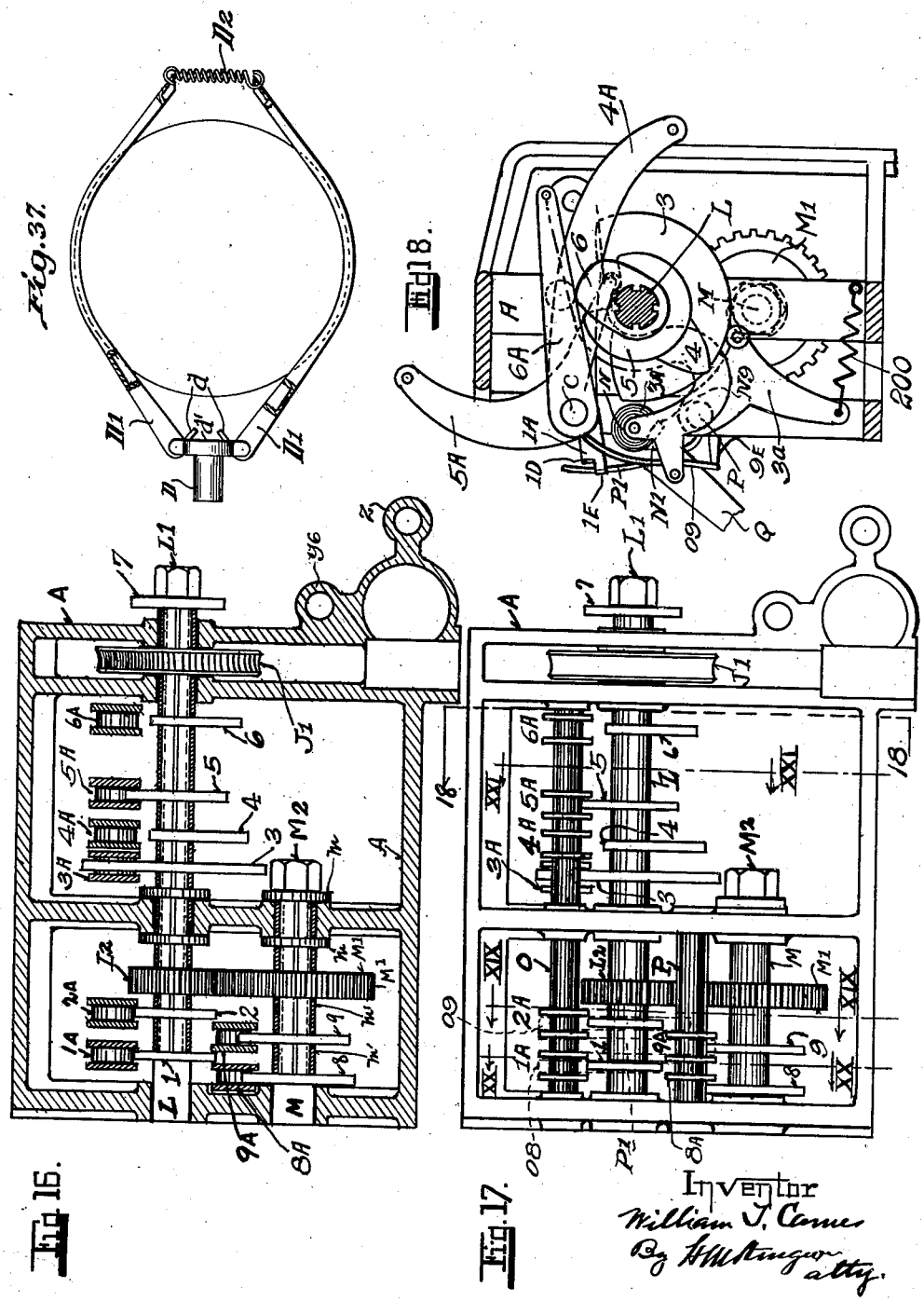

July 9, 1935.  W. T. CARNES  2,007,638
AUTOMATIC PHONOGRAPH
Filed Oct. 17, 1928  14 Sheets-Sheet 10
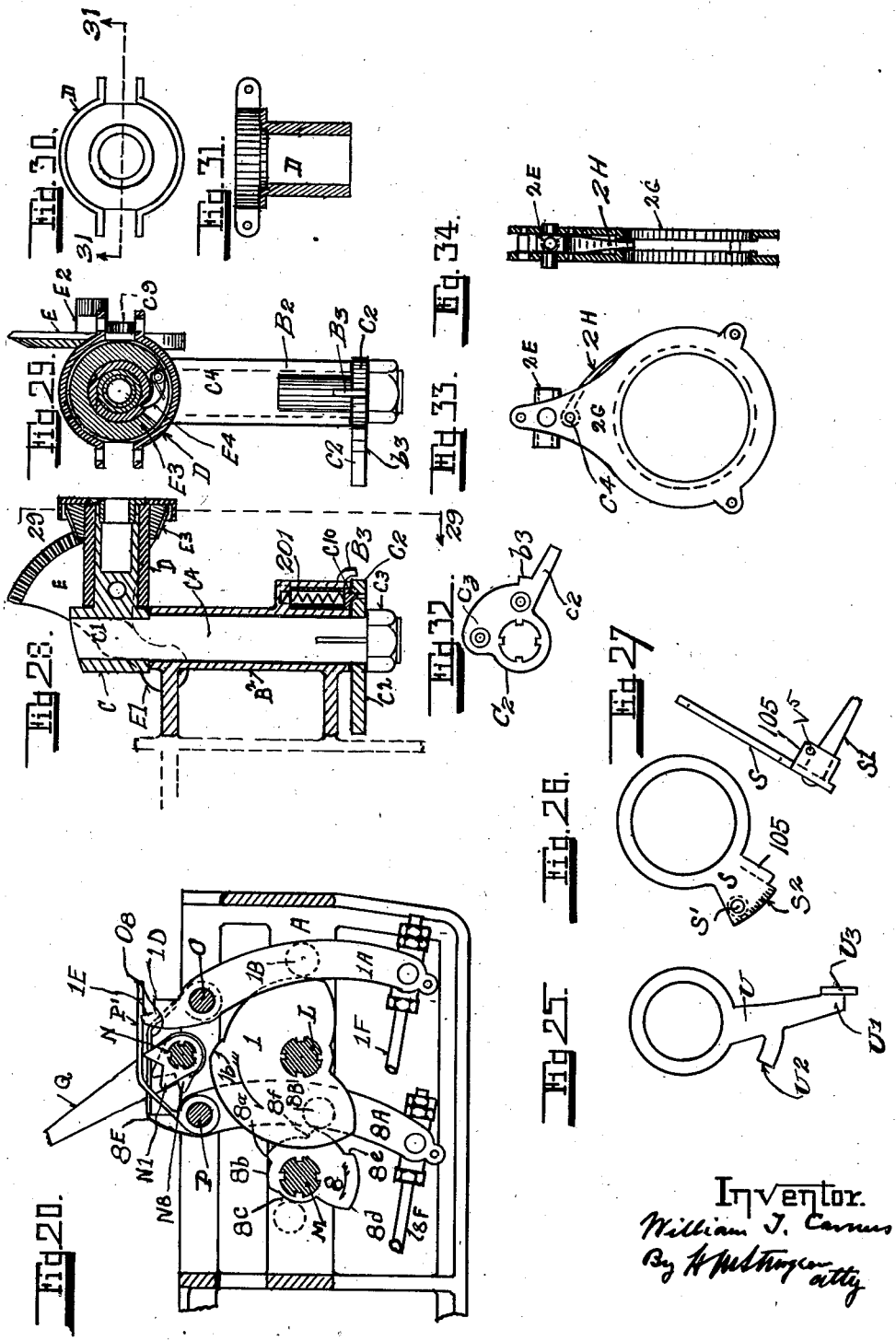

July 9, 1935. W. T. CARNES 2,007,638
AUTOMATIC PHONOGRAPH
Filed Oct. 17, 1928 14 Sheets-Sheet 11

Inventor
William T. Carnes.
By Thorpe & Thorpe
Attorneys.

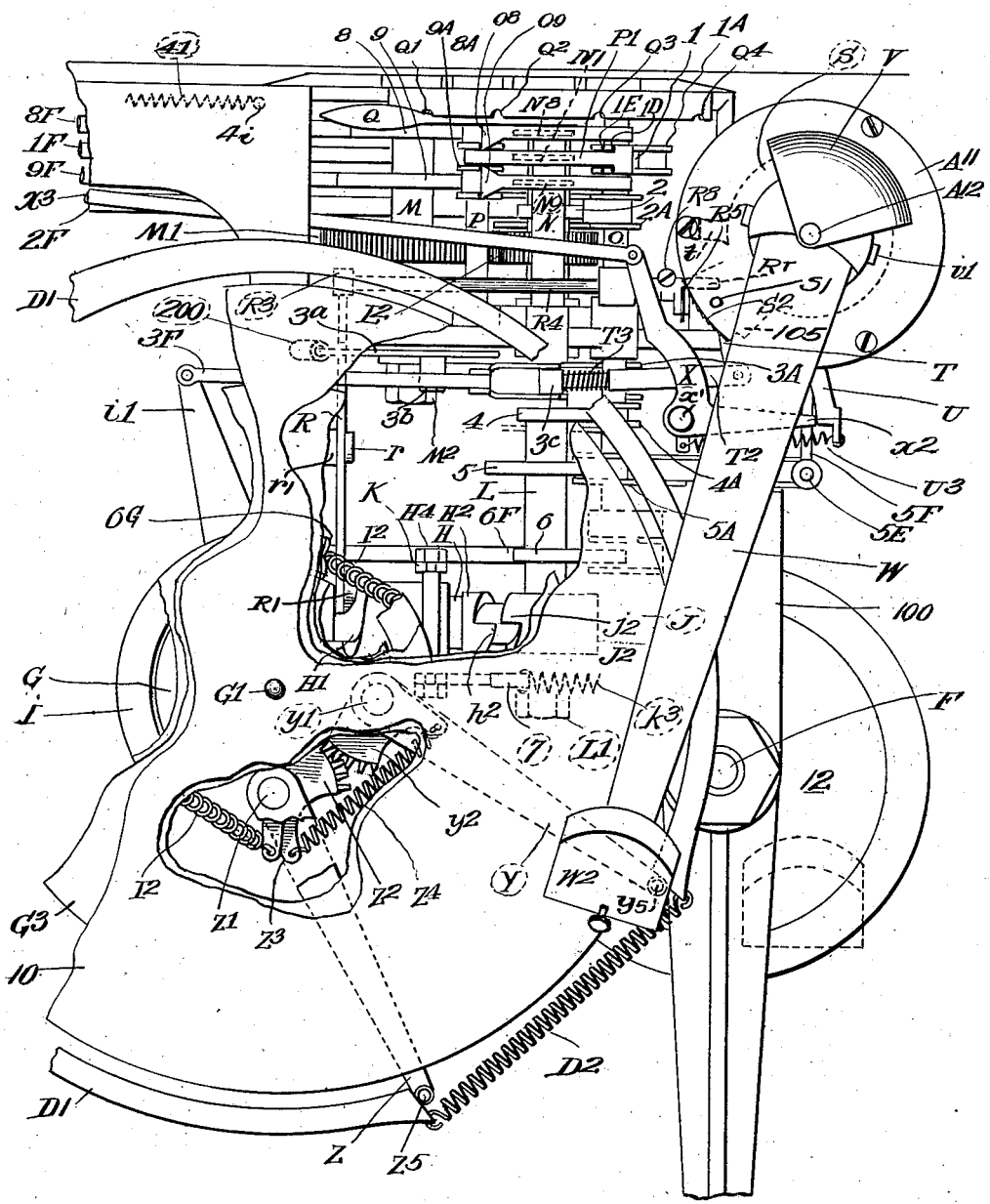

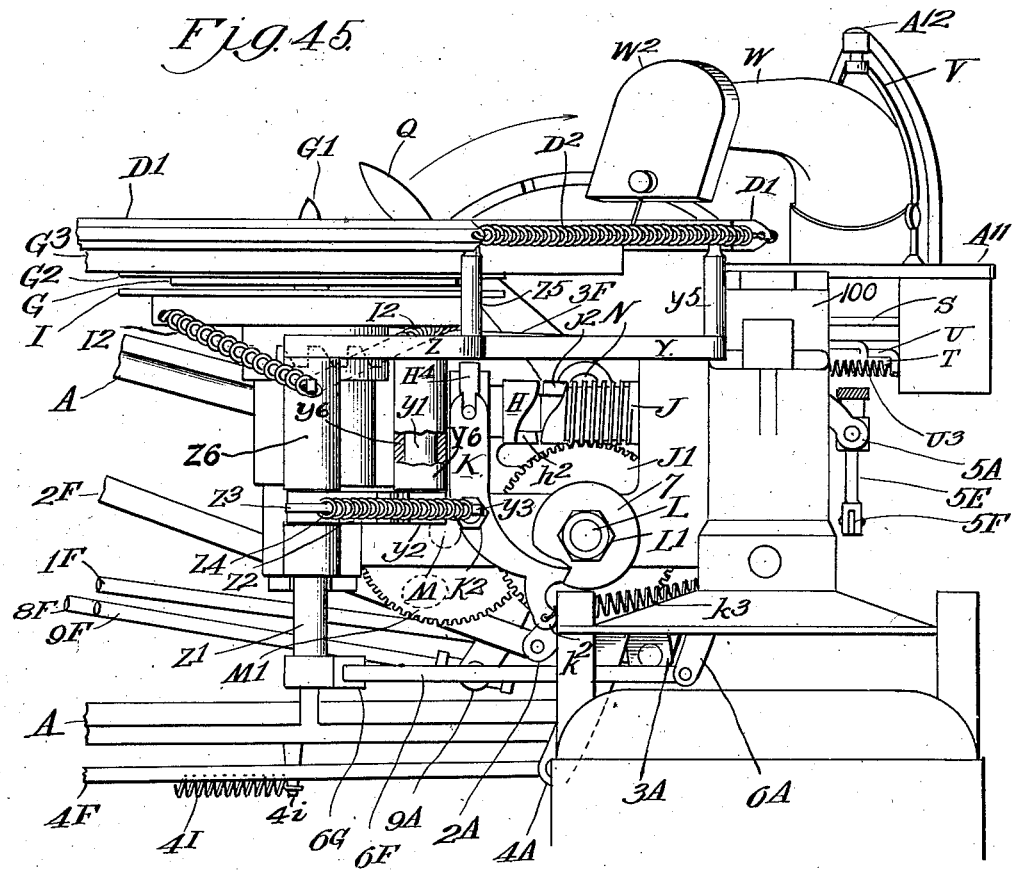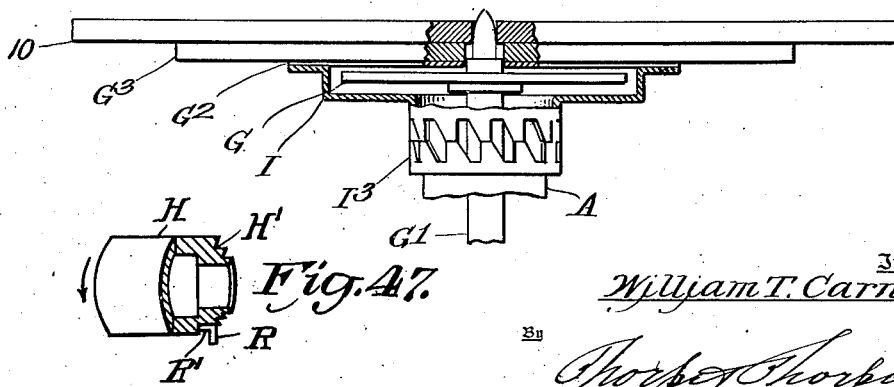

July 9, 1935.  W. T. CARNES  2,007,638
AUTOMATIC PHONOGRAPH
Filed Oct. 17, 1928   14 Sheets-Sheet 14
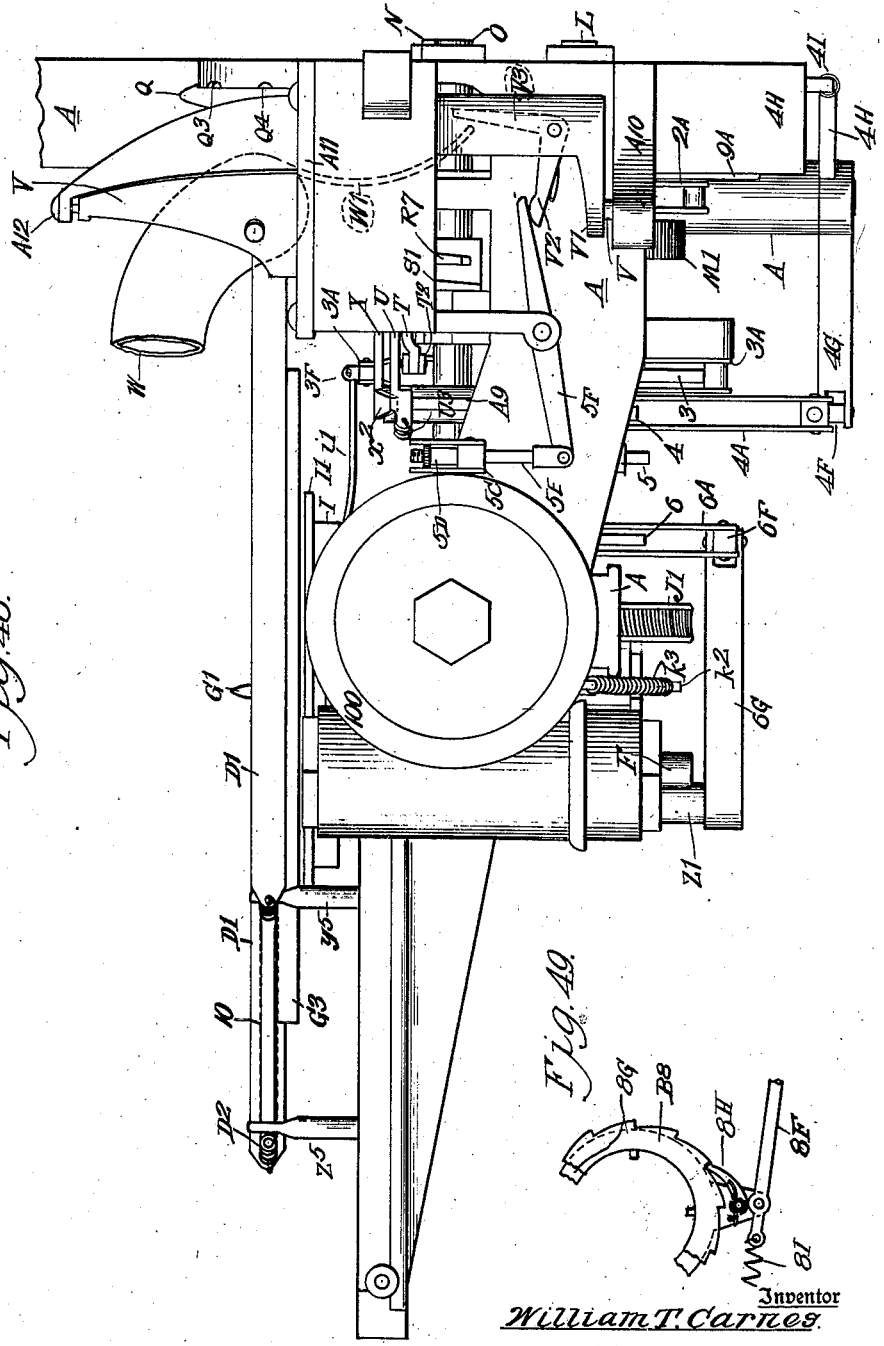

Patented July 9, 1935

2,007,638

UNITED STATES PATENT OFFICE 2,007,638

AUTOMATIC PHONOGRAPH

William T. Carnes, Kansas City, Mo., assignor to Carnes Artificial Limb Company, Kansas City, Mo., a corporation of Missouri Application October 17, 1928, Serial No. 313,038

79 Claims. (Cl. 274—10)

This invention relates to that class of automatic phonographs in which a series of records are played in regular order and in which provision is made for reversing the records for the playing of the opposite sides thereof.

My object is to produce a machine of the class mentioned by which corresponding sides of a series of records can be successively played, or corresponding sides of every alternate record be successively played, or by which each record can be successively played first on one side and then on the other, or by which each alternate record can be played first on one side and then on the other, the operations being entirely automatic in character.

A further object is to provide a machine including an intermittently rotated magazine for a series of 12" records and an equal number of 10" records, each of the small records being disposed alternately with respect to the large records, together with means for swinging each record outward from the magazine and depositing it in a horizontal playing position, and means whereby a tone-arm equipped with a sound box and needle, shall be adjusted automatically to accommodate the particular record whether large or small, when automatically placed in playing position.

A still further object is to produce a machine of the character outlined having a turn table driven continuously when the machine is in use, and intermittently operated mechanism for disposing a series of records, one at a time, on a floating disk, and for effecting a power transmission relationship between the said disk and the driven table for the reproduction of sound by the record and a cooperating sound box and needle, and for effecting re-elevation and consequent arrest of the floating disk and record after the reproduction has been made, the playing of the records occurring in the interim between the intermittent operations of the mechanisms for placing the records upon and removing them from the floating disk and effecting the raising and lowering operations of the latter.

Another object is to produce means actuated by outward movement of the needle when engaged with a record, for effecting the arrest of the movement of the latter and effecting the gripping of the latter and operation of the magazine to either restore the record to its proper place in the magazine and replace it with another record to be played, or to effect the inversion and replacement of the played record in playing position.

With the above mentioned general objects in view, and others of a tributary character, the invention consists in certain novel and useful features of construction and combinations of parts as hereinafter described and claimed; and in order that it may be fully understood, reference is to be had to the accompanying drawings, in which:—

Figure 2 is a view partly in horizontal section and partly in top or plan view of the same.

Figure 3 is a front elevation of the frame of the machine.

Figure 4 is a top or plan view of the same.

Figure 5 is a horizontal section on the line V—V on Figure 1.

Figure 6 is a detail of a portion of Fig. 5 on an enlarged scale.

Figure 7 is a vertical section on the line 7—7 on Figure 2.

Figure 8 is a detail vertical section of a portion of the frame showing the hub and one of the cams and the mechanism operated by said cam.

Figure 9 is a top or plan view of the lever operated by the cam in Figure 8.

Figure 10 is a vertical section of the hub and disclosing the ratchet plate for moving the rotary magazine intermittently in its clock-wise movement.

Figure 11 is a section of the hub of the frame showing the reversing ratchet plate for turning the rotary magazine in its anti-clockwise movement.

Figure 12 is a fragmental vertical section on line XII—XII of Figure 2 to show the cams and cam levers for operating the ratchets in Figures 10 and 11.

Figure 13 is a detail fragmental section showing the swinging arm mounted on the frame and the cam and cam lever operated by said cam for actuating said swinging lever.

Figure 14 is a detail horizontal section taken on the line XIV—XIV of Figure 13.

Figure 15 is a detail view showing the frame in section and the mechanism for raising and lowering the floating disk and for swinging the tone-arm to inoperative position.

Figure 16 is a horizontal section on the line 16—16 in Figure 7 with certain parts omitted.

Figure 17 is a plan view of the mechanism shown in Figure 16 and certain overlying features of construction.

Figure 18 is a transverse section on the line 18—18 in Figure 17.

Figure 19 is a section taken on the line XIX—XIX of Figure 17.

Figure 20 is a section taken on the line XX—XX of Figure 17.

Figure 21 is a vertical transverse section taken on the line XXI—XXI of Figure 17.

Figure 22 is a vertical central section of the supporting mechanism for the tone-arm.

Figure 23 is a horizontal section of the same on the line 23—23 looking in the direction of the arrow.

Figure 24 is a vertical section on the line 18—18 of Figure 17, with the mechanism in the background omitted.

Figure 25 is a plan view of one of the plates for operating the tone-arm.

Figure 26 is a similar view of another one of the plates for operating the tone-arm.

Figure 27 is an edgewise view of the same.

Figure 28 is a central vertical section of the mounting mechanism for carrying the record holders upon the rotary magazine.

Figure 29 is a section of the same on the line 29—29 in Figure 28.

Figure 30 is a plan view of a part of Figure 28.

Figure 31 is a longitudinal central section of the same looking in the direction of the arrow in Figure 30.

Figure 32 is a plan view of the lever secured on the lower end of the journal in Figure 28.

Figure 33 is a side view of cam bracket 2G.

Figure 34 is an edgewise central section of the same.

Figure 35 is a side view of the trip R3 and R5.

Figure 36 is a side view of the trip R7.

Figure 37 is a side view of the record carrier with portions thereof broken away.

Figure 38 is a side view of plate T.

Figure 40:
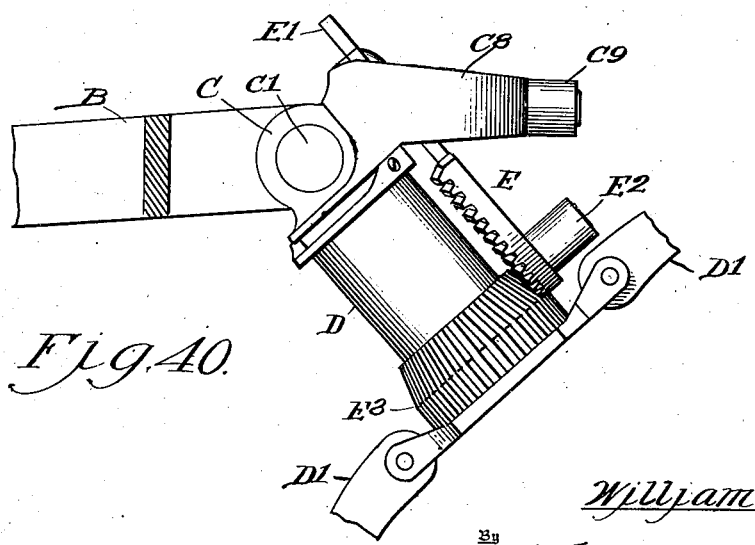

Figure 40 is a horizontal section through the peripheral portion of the magazine and showing in top plan one of the record carrying mechanisms in the position it occupies when the respective record is on the floating disk, the axis for the folding and unfolding movement of the record holder being substantially vertical at this time, and at the right-hand side of the magazine as indicated by Figure 2.

Figure 41:
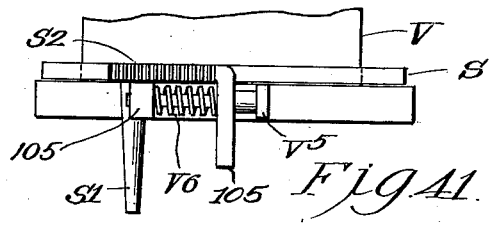

Figure 41 is a fragmental front view of the tone-arm support with a plate mounted thereon.

Figure 42:
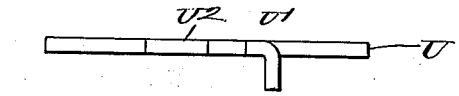

Figure 42 is a front edge view of another plate affecting the tone-arm swinging movement.

Figure 43:
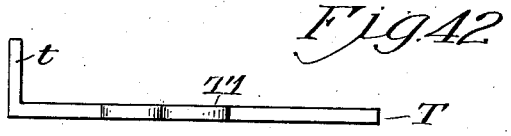

Figure 43 is a similar view of the third and undermost of the three plates affecting the tone-arm movement.

Figure 44 is an enlarged top plan view of the right-hand end of the machine and showing certain parts broken away to disclose the relation of such parts to each other and the position and construction of other features otherwise hidden.

Figure 45 is a front view of the construction shown by Figure 36 and on the same scale.

Figure 46 is a view partly in vertical section, disclosing the turn-table, the floating disk for the support of a record, and a plate adapted when rotated slightly to move upward and lift the floating disk from the turn-table, and lower the floating disk until the same is restored to driving relation with the turn-table.

Figure 47 is a detail view of a part of the clutch mechanism.

Figure 48 is an end view of the machine.

Figure 49 is a detail fragmentary figure to disclose parts not appearing in the preceding figures.

Figure 1:
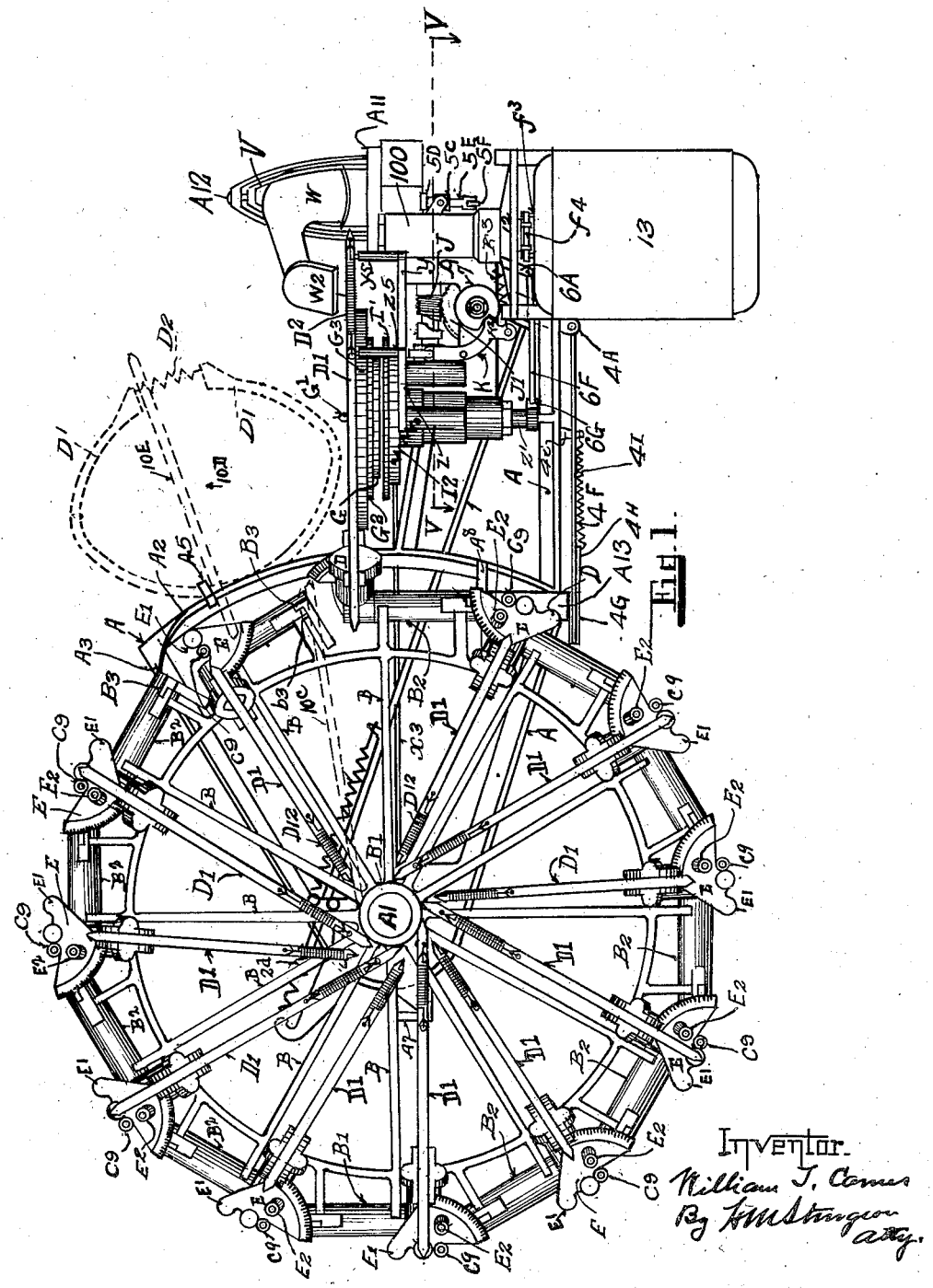
Figure 1 is a front view of my improved automatic phonograph.

In Figures 1, 3 and 4 the frame A is provided with a hollow horizontal shaft A'. The outer end of this shaft A' is provided with a lug having a hole in the center for the purpose of supporting and fastening the mechanism inside of the cabinet. There are three other similar supports shown in Figure 10.

On the shaft A' is mounted a revolving wheel-type magazine B. Abutting the end of the hub B' of this magazine, which hub is bored to fit the hollow shaft A' so that it will permit the magazine to be easily rotated, there is a collar $a$ (see Figure 2) securely fastened on the shaft A' by a set screw (shown but not numbered) so as to prevent the hub B' of the magazine from slipping out of place. On the back end of the hub B' are milled four keyways $b$ shown in Figs. 10 and 11.

On this hub is mounted a cam $B^4$ (Figures 2 and 8), and four ratchet wheels $B^5$, $B^6$, $B^7$ and $B^8$, the teeth of the ratchet wheel $B^5$ facing reversely to the teeth of the other ratchet wheels, and all are keyed conventionally in keyways $b$ of the said hub, and spaced apart and from the cam by collars (not numbered), on the hub. Four brackets 1G, 2G, 8G and 9G are associated with ratchet wheels $B^7$, $B^5$, $B^8$ and $B^6$ respectively and are equipped respectively with spring-actuated dogs or pawls 1H, 2H, 8H and 9H for engagement with ratchet wheels $B^7$, $B^5$, $B^8$ and $B^6$ respectively. The dogs or pawls 1H, 8H, and 9H and the associated ratchet wheels are disposed for effecting counter-clockwise movement of the magazine, and the dog or pawl 2H and ratchet wheel $B^5$ for effecting clockwise movement of said magazine.

These four brackets are each composed of two spaced plates each having three lugs on each plate and are held the proper distance apart by means of shoulder rivets, the respective spring actuated dogs being placed and held in position between the two plates by means of rivets $c^4$. Each of these brackets straddles one of the ratchet plates and allows the ratchet dog to come in contact with the notches as shown in Figs. 10 and 11. The ratchet bracket 2G (see Figures 33 and 34) is slightly different from the other three and works in the reverse way. In this bracket I have provided a knuckle 2E which has trunnions adapted to hinge in the holes bored for that purpose in the brackets 2G. This knuckle has also a small hole bored through it to permit it to slide on the small end $f$ of the rod 2F. There is also provided a shoulder rivet in the upper lug of said bracket, which, together with the other two shoulder rivets, hold the two plates the proper distance apart.

The upper shoulder rivet is also used for the purpose of attaching a spring 2D. Figure 10 shows this bracket in position with the front plate removed, and the spring actuated dog 2H is provided with a tail $h$. In this view I have shown a plate A6 with a narrow projection or arm $a6$. On the other end of the plate A6 I have provisions for supporting a spring 2—I. When the spring 2—I causes the bracket 2G to be pulled back to its limit, the tail on the spring actuated dog 2H comes in contact with the arm $a6$, causing the dog 2H to be raised up clear of the ratchet plate $B^5$, permitting the revolving magazine to be rotated as required.

There is a cam lever 2A, pivoted to a connecting rod 2F which is diametrically reduced (Figure 8) enough on one end to permit it to pass through the hinged knuckle 2E, which is hinged in the upper portion of the bracket 2G as explained. In the intermediate portion of this rod 2F is a lug f' to which one end of the spring 2D is attached. The other end of this spring is hooked on a shoulder rivet which holds the upper lugs of the brackets 2G in position. In Fig. 10 this plate is shown removed, so as to show the reverse ratchet action. On the small end of the rod 2F a spring 2—I is attached. The other end of this spring is hooked to the frame arm A6. As the backing up motion of the bracket 2G is only permitted to travel as fast as the declines on the cams 1 and 8 (Figure 20) will permit, and in view of the fact that the declines may not be at all times exactly in time with the backing up cam 2, (Figures 12 and 16), the spring 2D will yield, allowing the knuckle joint 2E to slip on the small end of the rod 2F but it will keep sufficient pressure against the receding cams to cause a steady backing up motion.

The backing up cam 2 (see Figures 12, 16, 17 and 10) is so cut as to be just a little in the lead of the receding cams 1, 8 and 9 (see Figures 12, 16, 17, 18, 19 and 20).

Journaled in the projection A—13 of the frame A, shown in Figures 1, 3 and 13, is a shaft 4J. On the upper end of the shaft 4J is secured a lever 4K with a roller k at the end thereof. This roller k at the proper time comes in contact with the levers or tails c—2 of the plates C2 and causes the partial rotation of the shafts C1 journaled in plates C4 and provides the means for swinging the record support D in position over the turntable, see Fig. 28. The drawings show twelve of said journal plates carried by and arranged in a circular series around the revolving magazine, one for each record.

On the lower end of shaft 4J is an arm 4G having an oppositely projecting arm or tail 4H (see Figure 14) the rear end of 4H is a spring 4—I which is attached at the opposite end to a suitable hook 4—i on the frame A (see Figure 2). The purpose of this spring is to cause the shaft 4J to rotate backwards to its normal position when the pressure is released on the cam lever 4A (see Figure 13). Cam lever 4A operated by cam 4 on shaft L, is connected by means of a knuckle joint to connecting rod 4—F which is securely fastened to the forward end of arm 4G of shaft 4J.

At the right-hand end of frame A is provided a housing 100 (see Figures 1 and 7), for the vertical worm shaft F and intermeshing worm wheel F1 (see Figures 5 and 7). At the front and lower portion of this housing a projection has been turned to fit the collar 101 of a suitable motor support 12 (see Figure 1), hereinafter described. Worm wheel F1 is mounted on the horizontal drive shaft F2 (Figures 5 and 7), and this drive shaft F2 has four keyways 102 milled in the outer end thereof and the worm wheel has been broached so as to fit snugly on said shaft and in said keyways so that it will not turn on the shaft. This shaft has bearings F4 and F5, (Figure 5), and mounted loosely on the shaft is a sleeve J. Worm threads have been cut on the periphery of the sleeve J which engage the teeth of the worm wheel J1 (Figure 7). On one end of this sleeve J is a flange or collar which engaging the housing, prevents endwise movement of the sleeve. On the other end it has two clutch jaws J2, shown in Figs. 1 and 5. The middle portion of drive shaft F2 is larger and has four keyways 103 cut in it. Mounted on this portion of the shaft, so as to slide but not turn, is a spring actuated clutch H, shown in Figs. 5 and 6. In one end of this clutch is provided a loose piece H2 with clutch notches h2. This portion H2 has been broached to leave four keys 104 that fit in the keyways 103 in drive shaft F2.

There is a collar H6 screwed on the threaded portion of H2. The threaded collar H3 is provided with left hand threads and a shoulder flange. The part H of the clutch, is threaded to receive and fit the collar H3 as shown in the drawing, Fig. 6. There is a shifting yoke H4 (Figures 6 and 7) with trunnions h4 to fit the upper slots in a pivoted fork K (Figures 1, 5 and 6). The yoke H4 fits around the collar H3 and in the groove formed by and between the flange on collar H3 and the upper end of the part or sleeve H, when said parts are screwed together. On the other end of this clutch H a spiral H1 has been milled for the purpose hereinafter described (Figure 7).

The clutch jaws h2 and J2 are cut slightly hooking, with the extreme points beveled at about 45 degrees bevel. The object of these beveled points is in case the point of one jaw should catch and the other jaw should come in contact with the top of the opposite clutch, it would fail to either go in, or slip, to prevent it from jamming. With the beveled jaw, in case they do not both enter past the bevel, the part H2 will be crowded back, compressing the spring H5, allowing it to slip out and then be forced back quickly within the next revolution.

In the larger portion of this shaft F2 there is milled a multiple worm thread F6 as shown in Fig. 5. I have provided a small turn-table G (Figure 1) fastened securely on a shaft G1 (Figure 5) and upon the shaft G1 is secured a worm-wheel F3 which meshes with the multiple worm F6 on the shaft F2.

The fork K is grooved or slotted on the upper portion thereof on either side to support the shifting yoke H4 and permit it to turn. There are two lugs provided in the lower portion with holes to fit the bolt K2. One of these lugs which extends down is curved to contact with cam 7. (Figure 1.)

It also has an additional projection for the purpose of attaching a spring k3 as shown in Fig. 1. In the frame A, are suitable holes bored for bearings for the fork K. The bushing K1 (Figure 7) is placed through these holes. The shifter fork K is slipped down over on the outside of the frame member and the bolt K2 is passed through the holes with its nut clamped against the ends of the bushing K1, and thus the bushing K1 becomes the journal for the shifter fork K, as shown in Fig. 7. I have provided a lever R pivoted at its center by shoulder screw r to a projection r1 (Figure 4) on the frame A. On one end of this lever R, I have provided a curved and slanting projection R1. On the opposite end is provided a suitable notch R2. A latch piece R3 engages the notch R2 holding the lever in the position shown in Figure 7, during the playing of a record. The latch piece R3 is fastened to rock-shaft R4, mounted in suitable bearings r4 in the frame A, see Figures 2 and 4. On the opposite end of the rock-shaft R4 I have provided a trip R5 (Figure 7). The trip R5 is provided with a hole adapted to fit the ends of the shaft against the shouldered portion and riveted thereon, so that the trip R5 is rigidly fastened on the rock-shaft R4. The trip R5 is for the purpose of tripping the mechanism when the record with the eccentric stop groove is used. At any time that the notches in the peripheral edge of plate S come in contact with the trip R5 in a backward motion it causes the shaft to rock and the latch key R3 releases the lever R permitting it to drop down and back of the spiral H1 on the clutch H. With a single revolution of the shaft F2, the clutch H is crowded endwise until the clutches h2 are engaged in the clutches J2. This causes the worm sleeve J to rotate with the drive shaft F2. The adjustable stop R7 is used for the purpose of tripping when playing a record that has a spiral groove and used for a stop on other records that have a uniform stopping place, see Fig. 36.

This adjustable stop is adjusted by means of a screw R8 and the spiral ending grooves are for the records which have the uniform stop. Stop R5 requires no adjusting as the eccentric groove 10A (see Figure 2) when engaged by the needle causes the tone-arm to be swung slightly back or outward. As this occurs the notched edge S2 of plate S (see Figures 5 and 7) engages the stop R5. This rocks shaft R4 forward to withdraw the latch arm R3 and thus releases the lever R sc that the front end of the latter may descend through the force of gravity for the purpose of effecting, through mechanism partly described hereinbefore, counterclockwise movement of the magazine and other operations, which must occur in the interim between sound-reproduction operations. The plate S rotatable horizontally around the axis of movement of the tone-arm, is provided as shown by Figure 26 most clearly, with a depending peg or pin S1, and with peripheral notches S2. There is provided on this plate an ear 105 projecting downwardly which has a hole drilled through it suitable to allow the adjustable screw V5 to pass through. In this plate S there is a large hole suitable to fit a turned portion of the swinging tone-arm support, and this plate is placed in position on said support and the adjusting screw V5 passes through the hole in the bent ear 105. Then the spring V6 is placed around the screw between the ear on the plate S and the threaded ear of the tone-arm support. The purpose of this adjusting screw is to adjust the tone-arm so that the needle will be lowered at a predetermined point on the record when in playing position. After this adjustment has once been made, it is not necessary to be changed unless a sound box carrying the needle in a different position should be substituted. The spring is merely to provide sufficient friction for preventing the adjusting screw from working loose or moving.

In the frame A, I have provided a suitable support A—10 (Figures 3, 4 and 12) which has been bored and faced to support ball bearings, not shown. In the upper portion of the frame A is secured a flange support A—11. The top portion of this support is threaded and provided with a dog nose screw A—12 shown in Fig. 12. As a suspension and swivel support for the swinging tone-arm support V which, on its lower end V1 has a short stud $v$ suitable to support the same in the ball bearing hereinbefore mentioned as placed in the support A—10. This swinging support V, when placed in its proper position, will swing silently with a minimum amount of friction. The upper portion of this swinging support is hollow and cut away on one side to permit the tone arm W to be pivoted by means of two pivot screws $v'$ carried by support V, and adapted to enter suitable bearings provided on either side of the tone-arm W. The base or pivoted end of the tone arm is provided with tail lever W1 (Figure 22). When used in connection with a conventional or other suitable electric pick-up which is used with a power amplifier speaker, (not shown) and in all cases where an acoustical horn is not required, I prefer to have this tail W1 on the inside of the swinging tone-arm support (as shown), but when used together with an acoustical horn it is necessary to have the tail pass through a hole, (not shown) in the back and on the outside of the swinging support. In the lower portion of this support V is a spring actuated lever V2 and the upper portion is marked V3. When this lever V2 is pressed down, V3 comes in contact with the tail lever W1 on the tone-arm, causing the needle to be lifted off of the record and held in that position while the tone-arm is swung clear of the record and until it has been returned to and lowered upon the next record. In the upper portion of the frame A between the bearings A—10 and A—12 (see Figure 12) is a hollow projection which is turned on its outside to fit the large hole in the plate T (Figure 7). Also the plate U (Figure 12) is placed above the plate T so that both plates can be turned a portion of a revolution. On the plate T is an arm having a hole T1 by which it is pivoted to a rod (see Figures 12, 15 and 38) T2. On the opposite end the shaft T2 has been turned down to a shoulder enabling it to be passed through a knuckle joint 3C. Between the shoulder and the knuckle joint 3C is a spring T3, see Fig. 15. At the extreme end is provided a small collar to prevent the spring from pulling the rod T2 out of the knuckle 3C. This knuckle 3C is hinged to the cam lever 3A which lever is also connected with the lever 3F, which is used in connection with the turning and raising of plate I.

Plate U, mounted to turn in a horizontal plane, has an arm provided with an ear which is bent downward and there are provisions for attaching a retractile spring U3 (Figure 5), secured at its opposite or left-hand end to a fixed stop A9, on the frame A. There is also provided a stop contact U1 on plate U, and another projection U2 of said plate comes in contact with the ear 105 on plate S (Figure 7), at the time the tone-arm W is permitted to be pushed to the left by this projection U2 (Figure 5), into a playing position. In the frame A, is the projection A9 which is used for a permanent stop, see Figure 5, for the plate U and hence of the tone-arm, as hereinafter appears. Above the stop A9 I mount a movable bracket X (Figures 2 and 7), hinged by means of a shoulder screw X1 (Figure 8) to a projection or boss on the frame A. One end of this bracket is a movable stop $x2$. The opposite end is hinged to a rod $x3$ (Figures 1 and 8). The rod $x3$ is attached to a swinging bracket $x4$, (Figures 8 and 10), mounted on a horizontal stud $x6$ which is fastened to the frame A. There is also provided on this bracket a roller $x5$. The roller $x5$ comes in contact with high and low points on the periphery of cam plate B4 (Figures 8 and 10) which causes the bracket X to move and operate its stop end $x2$. When the roller $x5$ comes in contact with a high point on the plate B4, the lever X is moved sufficiently to swing the stop end $x2$ out of position so that it will not come in contact with the point U1 on plate U. In that case the spring U3 will draw the plate U forward until it comes in contact with the permanent stop A9. The projection U2 will come in contact with the ear on the plate S, causing the tone-arm to swing the proper distance so that the needle will be lowered at the right place to start playing on the small sized record. The cam plate B4, see Fig. 8, is placed in the right position on the hub B1 of the revolving magazine B, so that when the magazine is stopped in the proper position, or with a small record supported over the turn-table in the playing position, a high point on the plate B4 contacts with the roller x5. Also vice versa when the large record is in position to be played, the low part of the plate B4 (see Figure 8), contacts with the roller x5 and the spring x4 will cause the rod x3 to be drawn back (to the left) to its limit so that stop x2 will be in position to contact at U1 with the plate U. Therefore it will cause the tone-arm to be so adjusted that the needle will be lowered in the proper place to start playing on the large record, see Figure 2.

Referring again to the mechanism for raising the tone-arm and needle, I have provided a cam lever 5A (Figures 7, 18 and 21) to operate in connection with cam 5. The roller on one end 5B comes in contact with cam 5 on the shaft L. Cam bracket 5A is hinged on horizontal shaft O. Hinged to the outer end of this bracket is a knuckle joint 5C to which is pivoted a rod 5E. One the threaded upper end of this rod 5E is provided an adjusting screw 5D. The lower end of 5E is slotted and hinged to a lever 5F (Figures 1 and 5). The lever 5F is pivoted to a stud 5f on the frame A, shown in Figs. 3 and 4. One end of the lever 5F is flattened to make a suitable contact on the swinging lever V2 in the swinging tone-arm support. (Figures 5 and 12.)

In the frame A is mounted the horizontal cam shaft L, and a parallel cam shaft M shown in Figs. 7, 12, 16 and 17 and in section in a number of the other drawings. These cam shafts L and M are provided each with four keyways milled from the threaded portion to the opposite end. On the rear ends of these shafts L and M, I have securely fastened collars, and the other ends are threaded to receive the nuts L1 (Figure 5), and M2 (Figures 16 and 17). Mounted on cam shaft L are cams 1, 2, 3, 4, 5, 6 and 7 numbered progressively from the rear forward. Intermediate between cams 6 and 7 is mounted a worm gear J1 (Figures 7, 16 and 17). All of these cams as well as the gear wheel J1 have holes broached in them, leaving places to fit the keyways that are milled in the cam shaft. mounted between the cams 2 and 3 is a small spur gear L2 (Figures 16 and 17).

I have provided space collars between each of the cams and gears, see Figs. 16 and 17, to hold them the proper distance apart. They are all clamped in place on the shaft L by means of the nut L1. Mounted on the cam shaft M are cams 8 and 9, also large spur gear M1 meshing with spur gear L2. Mounted on this shaft M on either side of the front frame support for shaft M, are two washers m. There are also spaced collars m' between the cams, gear and washers holding them in their proper places. The collar which is placed on the end of this shaft, and the one that is between the two washers m are journals which fit the bearings in the frame A. The washers are for the purpose of preventing the shaft from moving endwise. They are all clamped and held in place by the nut M2.

In the frame A I have provided suitable bearings n for a rockshaft N (Figures 3, 12 and 20). This shaft is smaller but similar to the cam shaft M, having four keyways milled in the same and threaded at one end. A threaded collar (not shown) is used in this case instead of the hexagon nut. Mounted on this shaft is a handle Q and three plates, with star points provided for a purpose hereinafter described, numbered N8, N9, and N1 shown in Figs. 7, 12 and 20.

The handle Q and the three plates have all holes broached in them to fit the four keyways in the shaft N. There are spaced collars provided between the plates and the handle and they are clamped securely by the threaded collar which holds them in their proper places and prevents them from turning on the shaft N. Parallel cam lever shafts O and P are mounted in the frame A at opposite sides of shaft N. Mounted loosely on the shaft O are cam levers 1A, 2A, 4A, 5A, and 6A (Figures 12, 16, 17 and 20). Mounted loosely on the shaft P are cam levers 8A, 9A and 3a. Attached to the cam lever 3a by means of a shoulder rivet is a roller 3b. To one end of the cam lever 3a is attached a spring 200, the other end of which is attached to a hook on the lower portion of the frame A (Figure 18). The cam levers 1A, 4A, 8A and 9A are each provided with a hinged joint 1C and 9C to which a small rod is secured as shown in Fig. 12. The other cam brackets do not require adjusting in that way.

In the frame A near the support of the turn table spindle G1, see Fig. 5, are two projections with holes Y6 and Z6 to provide bearings for shafts Y1 and Z1. Mounted securely on the lower portion of the shaft Y1 is a segmental gear Y2. On the upper portion of this shaft is mounted a lever Y with a finger Y5. Mounted intermediately or between the bearings of the shaft Z1 is a segmental gear Z2. Mounted at the upper end of the shaft Z1 is a lever Z (Figure 1) with the finger pin Z5. At the extreme lower end of this shaft mounted securely is a lever 6G. To the lever 6G is connected a rod 6F which rod is hinged to cam lever 6A, as shown in Fig. 1. On segmental gears Y2 and Z2 are provided projections suitable for attaching a spring Z4. Cam lever 3a is provided with a roller 3b which contacts with the cam 3. Cam lever 3a is hinged on the front end of the shaft P, as shown in Figures 15 and 18. Cam lever 3a is for the purpose of pulling the latch end of lever R2 down so that the latch key R3 will engage in the notch R2. (Figure 7.)

I have provided a horizontal plate I, Figures 1 and 15, stamped out of sheet metal and drawn into suitable shape with the upper portion flanged as indicated at I—1, to come in contact with the floating disc G3. There is a collar drawn on the lower portion which has six spiral notches milled in the extreme lower part and forming cams. There is attached to this plate a projecting lever or arm i—1. The outer end of this lever is hinged to the connecting rod 3F which connecting rod is hinged at the other end to the cam lever 3A. On the upper portion of the frame, adjacent to the upper bearings of the turn-table spindle G1, a projection has been turned to fit the collar portion of the lift-plate I, which has been turned suitable for the purpose, I have mounted a collar I—3, which has six spiral notches milled in the upper portion, as shown in Fig. 3. The stamping I, with its collar and corresponding notches, fits the notches of the collar I—3. In the rotation of the cam 3, which comes in contact with the roller 3B in the cam lever 3A, cam lever 3A is moved backward and with its connecting rod 3F attached to lever I—I causes the lift-plate to turn a sufficient amount and slide upward on the inclines on spiral inclines until the high points are resting on top of each other. The flange portion I—I comes in contact with the friction disc G2 which is on the under side of floating disc G3 and raises G3 off of the turn table G about 1/8". The floating disc is held in this position while the record is being removed and until the next record is placed in position on top of this disc G3. I have provided in the lift-plate I, means for attaching on opposite sides springs I—2 (Figures 1 and 2) which on their other ends are attached to projections which are provided for the purpose on frame A. It will be seen that these springs are attached in a way so that both are pulling at an angle so that the lift-plate is rotated backward and downward, and when the cam 3 has rotated far enough to allow the cam lever 3A to be drawn back to its normal position, the lift-plate I will also be forced backward and downward to its normal position, thus lowering the floating disc G3 and its friction disk G2 to contact with the turn table G, and as the turn table G is in continuous motion, the friction is sufficient to cause the floating disc G3 to rotate with the turn table G and thus give proper motion to the record while it is being played. The lift-plate I is caused to move down far enough when in its normal position so that there is about 1/8" space between its flange and the floating disc G3. This method of starting and stopping the record's rotation while the same is being transferred to and from the floating disc without its being necessary to stop the turn table G is a novel feature, as suddenly stopping the turn table gear causes a jerk and considerable wear to the gear F3 and is liable to cause unevenness in the teeth which in turn will have a tendency to produce a waver in the music which the automatic phonograph furnishes.

Mounted on the shaft O, (Figures 2, 5, 12, 13, 15, 17, 18, 19 and 20) I have provided two latches O—8 and O—9. Mounted on the shorter parallel shaft P, I have provided a latch P1 shown in Figures 2, 12 and 20. On the upper portion of the cam lever 1A (Figure 20), I have provided two catches or teeth 1E and 1D for the purpose of engaging the latch P1 when it is released and allowed to drop a sufficient amount to engage with one notch or the other. In the position shown in Figs. 12 and 20 where the adjusting handle Q is placed in stop notch Q1 the first or right-hand point on plate N1 (Figure 20) comes in contact with the latch P1 on shaft P and holds it just high enough so that its catch or tooth misses the catch 1D in the upper portion of cam lever 1A, but comes in contact with catch or tooth 1E of lever 1A. When the adjusting handle Q is placed in the notch Q2 the star point on plate N1 on shaft N is rotated far enough to disengage the latch P1 and allows it to drop far enough to engage the catch 1D on the upper portion of cam lever 1A. The second star point on the plate N1 is longer than the first star point and when the handle Q is moved to the position and engaged in the notch Q3, the second or longer star point raises the latch P1 high enough so that it does not come in contact with either notch 1E or 1D on cam lever 1A. When the handle Q is moved to the position and engaged in notch Q4, the long star point on plate N1 is rotated far enough so that it permits the latch P1 to drop low enough again to engage the catch 1D in the upper portion of cam lever 1A. When this cam lever is latched at 1D the spring I—I is prevented from backing up the ratchet bracket I—G therefore nullifying the action of cam lever 1A, see Fig. 11. When the latch P1 is raised a sufficient amount to engage the catch or tooth 1E on the cam lever 1A as shown in Figs. 12 and 20, it will permit part action of cam lever 1A, causing the ratchet dog 1H (Figure 11) to rotate backward and forward only one notch. When the latch key P1 is raised to its full height as when the handle Q is engaged in stop Q3, cam lever 1A is allowed to travel its full motion and the ratchet dog 1H engages in every other notch of the ratchet plate B1, thereby causing the rotation of the revolving magazine B two spaces at a time. Cam levers 8A and 9A on shaft P (Figures 12, 19 and 20) are provided with one projection or catch only, 8E and 9E. The latches O9 and O8 pivoted on shaft O, are raised and lowered by the various positions of the handle Q, which causes said latches respectively, to nullify the action of cam levers 8A and 9A, or permits their action as the case may be, but only operates on one notch at a time. When the handle Q is in the position shown in Figs. 12 and 20 engaged in stop Q1, both latches O8 and O9 will contact with the catches 8E and 9E respectively, on the cam levers 8A and 9A, thus nullifying their action.

When handle Q is moved to stop Q2, the first or right-hand star point on plate N—8 on shaft N (Figure 20) causes the latch O—8 to be lifted and frees the action of cam lever 8A. When the handle Q is moved to stop Q3 the first star point has moved sufficiently past the point of contact on latch O—8 to permit it to fall again so as to engage the catch 8E of cam lever 8A thereby again nullifying its action. When the handle Q is moved to stop Q4 the second star point on plate N—8 causes the latch O—8 again to be lifted and frees the action of cam lever 8A. In other words, the cam lever 8A is only permitted to have action when the handle Q is placed in stops Q2 and Q4 and in the other two positions its action is nullified as has been described. When the handle Q is placed in stop Q1 the latch O—9 is permitted to engage the catch 9E on the cam lever 9A causing its action to be nullified and also when the handle is placed in the stop notches Q2 and Q3. When the handle is moved to stop Q4 the star point on plate 9 engages in the latch O—9, causing it to be lifted and thereby freeing the action of cam lever 9A. Cam lever 9A is only permitted action when the handle Q is placed in stop Q4.

Mounted on the cam shafts L and M are intermittently operated spur gears L2 and M1. (Figures 12, 16 and 17.) The ratio of these gears is one to two. As the cam shaft L makes one complete revolution the cam shaft M is only turned a half revolution.

The cams 8 and 9 (Figures 7, 16, 17, 19 and 20) mounted on cam shaft M, are double in their action, that is effect two operations in each revolution. With reference to the first half revolution of cam 8, starting from the position shown in the drawings in Fig. 20, it first has a decline 8A, and then has its first rise, which is sufficient to only rotate the revolving magazine counter-clockwise about five-sixths of the usual one step or space, through the action of lever 8A, rod 8F and the related ratchet mechanism at the center of the left-hand end of the machine. This is sufficient to raise the record support D, from the horizontal plane of the turn table high enough to cause said support to turn but it is not rotated far enough to prevent the spring actuated dog 2H, see Fig. 10, from engaging the first ratchet notch on plate B5. Therefore it is at this time backed up to a position about one inch above the turn table. There is then a rest portion 8b on the cam 8 to allow sufficient time in the backing up motion for the vertical shaft 4J and the roller 4K (Figure 13) to go through their motions, although at this time there is nothing for them to do, and when they have returned to their normal positions the further decline of the roller on cam lever 8A from 8b to 8c is permitted by the cam 8.

In Fig. 20 it will be noted that the two opposite places, where the roller 8B of the cam lever 8A comes to rest after the cam action has stopped, permits the playing of the record. On the second half revolution of the cam 8 there is an incline to high point 8d. This high point is sufficient to cause a rotary motion to the revolving carrier of a little over one notch of the ratchet B5 to bring the record support in a plane of about one inch higher than the turn table. In view of the fact that the backing up ratchet B5 is rotated too far to permit the dog 2H to come in contact with the first notch of said ratchet, and on the first backing movement, the bracket 2G is moved over far enough to cause the ratchet dog 2H to come up to the second notch of said ratchet where it rests until the shaft 4J has turned to cause the roller 4K to swing the record over on the turn table. After the roller 4K has returned to its normal position, as shown in Figs. 13 and 14, the roller 8B on the cam lever 8A (Figure 20) has come to the point of decline 8c on cam 8 and at this point the backing up cam 2 is permitted to rotate the revolving carrier back until the projection on plate C2 comes in contact with stop A8 on the frame A, see Figs. 1 and 3, and in the right position for the record support to deposit the record on the floating disc G3.

Cam 9 is also mounted on cam shaft M, and on its first half revolution has nothing to do but prevent cam lever 9A from backing up in the first revolution of cam shaft L and in the first half revolution of cam shaft M. Starting on the second revolution of cam shaft L and the second half revolution of cam shaft M, the cam lever 9A is permitted by the decline 9b of cam 9, see Fig. 19, to swing back far enough to allow the ratchet dog 9H, see Figs. 10 and 11, to engage the first notch back on the ratchet plate B9. It raises quickly on the incline on cam 9, see Fig. 19, to the point 9C. The rise up to 9C on cam 9 takes place before the roller on cam lever 8A has reached the raising point to start up the incline 8d on cam 8, see Fig. 20, and when the cam lever 9A is permitted freedom of action it causes only one space of rotation to the revolving magazine B; and then following this movement, cam 8 causes the cam lever 8A to rotate the revolving carrier B a second space. This double rotation of two spaces in this case happens in every other revolution of the cam shaft L or in the second half revolution of the cam shaft M.

In Figs. 1 and 2 are shown a novel support for direct connected motor 13, which is reserved as a subject for separate application for patent viz:

On the lower end of the worm-shaft F, is a collar $f^2$ with four projecting pins, see Fig. 7. On the upper end of the motor shaft is attached a similar collar, see Fig. 1, but considerably larger. Threaded in and out between the pins on the collar $f^2$ and the pins on the collar $f^3$ is an endless belt $f^4$, see Fig. 1. This provides a non-metallic connection, but a positive drive from the motor shaft to the worm shaft F.

In operation when the handle Q is placed in stop Q1, and the tone-arm is in position for the needle to traverse the music grooves on the record disc 10, as shown in Fig. 2, the power is supplied from the motor by means of the belt connection to worm gear shaft F, which in turn causes gear wheel F1 to revolve and turn the drive shaft F2, and the latter, through its gearing connection with the gear wheel F3 on the turn-table spindle G1, gives the proper speed motion to turn-table G. The floating disc G3 with its friction disc G2, being in contact with the turn-table G, is caused to rotate with the proper speed with the turn-table G. After the needle has traversed the music groove 10A on the record and the tone-arm is swung first slightly inward of the record and then back by the eccentric groove 10A, the movement of the tone-arm, causing the ratchet teeth S2 on plate S which swings with the tone-arm, to engage in one of its notches against the stop spring R5, causing it to rock the shaft R4 in a way that the latch-key R3 is pulled out of the notch R2 in the rock lever R. As the opposite end of rock lever R is the heavier, this end will drop back of the driven rotary clutch H, (Figure 7). The lever R with its curved slanting portion R1 will come in contact with the spiral H1 on clutch H and in the revolution of the latter will crowd it toward the worm sleeve J, until its clutch $h-2$ engages the clutch notches J2 of the worm sleeve J. In case they do not happen to interlock properly when they first come in contact, the bevel on the clutch jaws $h2$ and J2 will cause them to slip past, crowding sleeve H2 back against the compressing spring H5, and, as soon as the notches are past so as to be in the clear, the spring H5 will cause sufficient pressure on sleeve H2 to move it forward and engage quickly in the next half revolution, latching securely in the worm gear which will cause it to rotate with the drive shaft F2. Through its connections with the teeth on worm-wheel J1, the cam shaft L is rotated one complete revolution. Also the cam shaft M, by means of its geared connections, M1 and L2, will also rotate but only one-half turn at a time. As the cam shaft L rotates, the cam 7 will come in contact with the lower end of shifter fork K, crowding it down at that end and, by means of the shifter yoke H4, see Figs. 5 and 6, forces the clutch H into deeper engagement with clutch sleeve J, and holds it in that position until the cam 7 has made a complete revolution and returns the notch or decline on its periphery, to the initial position, at which time spring $k3$ pulls the lower end $k2$ of the shifter fork K into said notch, the opposite end of the fork disengaging the clutch members H2 and J2 to arrest the operation of the shaft L to permit the playing of the record. This also causes the pressure of clutch H to be released from shifter lever R, so that at the proper time, it can be relatched with the spring pressure from lever 3—a. In case that a different style record is being played with a spiral stop groove like or similar to the one shown in Fig. 2, 10B, the needle is carried forward until it reaches the point of the spiral groove nearest the center of the record. The stop pin S1, on plate S, see Figs. 26 and 27, comes in contact with adjustable stop R7. Adjustable stop R7 can be adjusted by means of adjusting screw R8, so that when the needle has reached the last playing groove, the pin S—1, comes in contact and crowds stop R7 backward and causes the rock-shaft R4 to turn a sufficient amount to disengage the latch-key R3 from the notch R2 in shifter lever R, see Fig. 7, and causes it to shift the clutch H in the way before described. In the rotation of the cam shaft L, cam 5, as it starts in motion the roller 5B, (which is attached to cam lever 5A), will roll up on the high point on the periphery of the cam, causing the cam lever 5A to lift, through its connections, the front end of the lever 5F and tip the back end of this lever sufficiently to come in contact with and cause the lever V2 in the swinging tone arm support to be crowded down so that the upper end of this lever V3 comes in contact with the tail lever W1 of the tone arm and causes the tone arm and needle to be raised about an inch above the record. This upward adjustment of the tone arm and needle can be varied by the adjusting of nut 5D (see Figure 48) on threaded member 5E, to increase or decrease the height of the needle when not in operative relation to the record. As soon as the needle has been raised from the record, cam 3 has turned a sufficient amount to cause the lever 3A, by its roller 3B, as it comes in contact with its periphery, to be pushed backward and through its connecting rod T2, which is hinged to the lever end of plate T, causing plate T to turn on its support and its projection t to come in contact with the plate S, which is connected to and turns with the tone-arm, causing the tone-arm to swing to the position shown in the dotted lines in Fig. 2. As the plate S is turned on its support, its downward projecting ear 105 comes in contact with the projection point U2 on plate U, see Fig. 25. The spring U3, which is attached to the plate U, holds it in position against the adjustable stop X2 and at other times against the permanent stop A9, owing to the fact that this spring is stiffer than the spring T3 which is between the shoulder on connecting rod T2 and the knuckle joint 3C. As the lever 3A is crowded back by cam 3, it will cause the spring T3 (Figure 15) to be compressed about a fourth inch until the end of the rod T2 comes in contact with a roller placed in the lever 3A for that purpose. This roller is shown in dotted lines, Fig. 15.

As the cam lever 3A travels back by means of its connecting rod 3F, which is connected with lever i—1 of the plate I, the latter is turned on its spiral notch support, see Figures 1 and 46, and, as it turns, it is raised up, coming in contact with the friction disc C2 on the under side of the floating disc G3 and raises disc G3 off the turn-table G, causing the disc G3 and record 10 to stop rotating. Cam 6, see Fig. 24, has been rotated a sufficient amount to allow the roller 6B to travel down on the incline of cam 6, releasing the pressure and permitting cam lever 6A to return to its normal position, thus allowing the spring Z4, through the geared connection, y2 and Z2, to rotate the shafts y1 and Z1, causing the fingers y5 and Z5 on levers Y and Z to come together sufficiently to clear the record supports D1 when they have been drawn together to their limit by the spring D—2 or to clamp the record 10 in a way that will hold it securely while it is being lifted from the floating disc above the turn-table and while it is either being turned over or swung back in the revolving carrier until it again is placed in the playing position. In case there is no record placed on the turn-table, the record supports D1 will come closer together, or until their projections d come in contact with the contact point on the outer end d—1 of the revolving bearing D, preventing them from coming too close together to clear the fingers Y5 and Z5 on their following return to the playing position.

When the handle Q is in the first or left-hand stop Q1, as shown in the drawings of Fig. 12, then cam 1 has, by this time, been turned sufficiently to allow the roller 1B (Figure 20) on cam lever 1A, to travel down its incline. As this occurs the spring 1—1 draws the connecting rod 1F to the left, which rotates cam bracket 1C, as far backward as the latch P1 will permit because of the latter coming in contact with the second catch 1E on the upper portion of cam lever 1A (Figure 12), and, in this case, bracket 1G is only permitted to back up far enough to engage in the following notch of the ratchet plate B1 (Figure 11). As the cam turns further the roller travels up the incline of cam 1a and swings the lever 1A backward a sufficient amount to cause bracket 1G to rotate the revolving record carrier until the next record support and record therein is brought up to the position shown in dotted lines 10C, see Fig. 1.

As the record support D and the record that has just been played is raised up, and as the revolving carrier is being revolved to position the next record for the playing thereof, roller E2 attached to segmental gear E, comes in contact with a projection A5 on the frame A and as it is going up it is pushed down by this contact, causing the segmental gear E to turn on its fulcrum by its teeth coming in contact with the bevel gear E3. The bevel gear E3 has a spring actuated dog E4, see Fig. 29. The spring actuated dog E4 is engaged in one of the notches in the revolving record support, thus causing this support, through its connections, to rotate one-half revolution, turning the record over so that the lower side is then in position to be played the next time. To accommodate the inversion of the record, it must have attained substantially the height shown in dotted lines 10D in Fig. 1, 10E showing the required distance the record is to be raised to make its complete turn or one-half revolution of the record support D. As the counter-clockwise rotating movement of the magazine is continued, the roller C9 comes in contact with the cam or spiral lug A2 of the frame A (see Figures 1 to 4 inclusive), and as the roller (see Figure 4) travels up said lug, the former is caused to move forward and apply turning force on shaft C1, the pressure or force being sufficient to cause locking pin C10 (see Figure 28), to be crowded up out of the hole in the plate C2 and the record support is then swung in until lock pin C10 drops in the other hole of plate C2, locking it and holding it in said position until it is again returned to the playing position. In view of the fact that the segmental gear E was pushed down to its limit of rotation in that direction by the roller E2 having come in contact with the projection A5, see Figs. 3 and 4, on the frame A, which movement caused the half revolution of the record support D, it will be seen that the segmental gear E and the smaller gear E3 which has the spring actuated dog E4, will remain in this position until the said record support is revolved far enough to come into the second position or space above the turn-table. At this time, cam 2 (Figure 19) has rotated a sufficient amount so that the roller 2B on lever 2A has rolled up its first incline at its periphery point 2—a, thus causing the cam lever 2A to swing backward and as the bracket 2G is drawn forward by the spring 2D which connects it in a pulling way with the connecting rod 2F, as the bracket 2G is rotated forward, the tail of the dog 2H is moved away from the stop a—6 on plate A6 and the spring causes it to engage the next notch in the ratchet plate B5, see Fig. 10.

Figure 39:
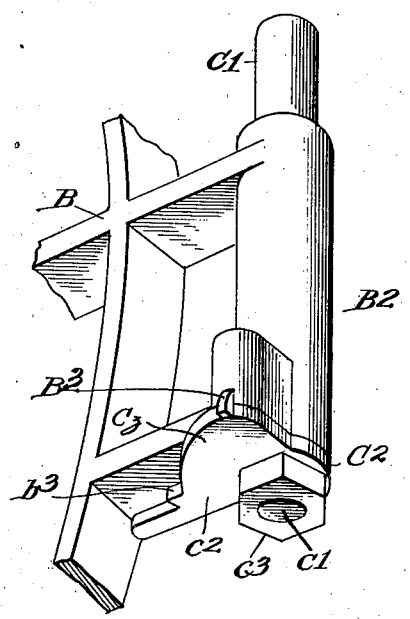
Figure 39 is a fragmentary perspective view of the peripheral portion of the magazine as equipped with a journal element for the support of the record carrier, the figure also showing a part of the record carrier in the position it occupies when the respective record is in folded or inoperative position relative to the magazine.

At this time, this ratchet B5 is only moved forward far enough to come to a position opposite the notch and rests for the time being. At this time, the incline of cam 4, see Fig. 13, has come in contact with the roller 4B on cam lever 4A, causing it to push the cam lever 4A backwards and through its connecting rod 4F, which is attached to lever 4G on shaft 4J, it will rotate shaft 4J to bring the roller 4K in contact with the tail lever or projection c—2 on plate C2. As this plate and its connections are turned, it will cause the locking pin C—10 to be crowded up out of the taper hole in plate C2 and permit it to be rotated until its stop b—3 comes in contact with stop B3, a projection on B2, see Figures 28, 29 and 39. The spring 20I in a hollow offset of the magazine element B2, in this locking action forces the pin C10 into one of the holes in the plate C2, holding it in this position and preventing it from turning backwards until the proper pressure is supplied to return it to its normal position later on. Or in case after it has reached the position shown in dotted lines 10E, see Fig. 1, a position high enough to have caused the record support to make its half revolution and it is backed up to the turn-table from that position, the roller E2 on the segmental gear E comes in contact with stop A4 on the frame A, said stop being shown in Figs. 3 and 4, and as it is backed up to the playing position, the segmental gear E is pushed and rotated upward a sufficient amount to rotate the gear E—3 far enough backwards so that its ratchet dog E4 engages in the notch on the opposite or under side in the revolving record support D, shown in Fig. 29. It will then be in position to be rotated the second time as the roller E—2 on segmental gear E comes in contact with the stop A—5, see Figs. 3 and 4 as it is passing on its next trip. At this time, the roller 4B in cam lever 4A is traveling down the decline on cam 4, see Fig. 13, permitting the spring 4—I, which is attached to the tail 4—h of lever 4—G, and causing the shaft 4J to rotate backwards so that roller 4K will return to its normal position, see Fig. 14. Roller IB, see Fig. 20, on cam lever IA at this time has started down the decline I—b on cam I and roller 2B is traveling up the incline 2—b on cam 2, see Fig. 19, causing the ratchet bracket 2G, see Fig. 10, with its spring actuated dog 2H to come in contact with the first notch of the ratchet plate B5 and rotate the revolving magazine backward until the lateral enlargement or projection C3 of plate C2 has come into contact with the frame arm A8 (see Figure 3), it being understood that the plate C2, preliminary to the back movement of the magazine, has been turned by the crank arm 4K about 90° from its normal position in order that said lateral projection C2 might be disposed over stop arm A8 for contact therewith to terminate the back rotation of the magazine.

This movement of plate C2 from its normal position, is to rotate shaft CI (see Figure 28) and effect the swinging of the record over but spaced from the turntable, so that upon the backward rotation of the magazine, the record is deposited upon the floating disk G3, the arrest of the said backward movement occurring at the same time. Cam 6, see Fig. 24, by this time, has rotated far enough to permit the roller 6B in cam lever 6A to come in contact with and roll up its incline, which pushes cam lever 6A backward by means of its connecting rod 6F, which is connected to the lever 6G on the shaft ZI, see Figures 5 and 45, causing it to rotate, and, through the segmental gear Z2 and y2 the shaft yI is rotated simultaneously, causing the two levers Z and y and the projecting fingers Z5 and y5 to spread and come in contact with the support DI on revolving record support D at their outer end which causes them to spread far enough to release the record, as shown in Fig. 2. At this time, the roller 3B in the double cam lever 3A, see Fig. 15, is traveling down the decline on cam 3 and as the two springs I—2, which are attached to plate I on opposite sides, and in a way to cause it to rotate backwards and down its spiral notches when the pressure is released on the roller 3B of cam lever 3A, this plate is lowered and allows the floating disc G—3 with the record 10 to be lowered to the revolving turn-table G and at the proper speed for playing the record 10. Plate I is lowered in this operation a sufficient amount below the floating disc so that there will be no danger of its touching the floating disc or interfering with its rotary movement. At the same time, the floating disc is being returned to the turn-table G, the plate T is being turned on its bearing to release the pressure on its contact point t on the plate S, permitting the spring U—3 to draw the lever or plate U forward until its contact point UI comes in contact with the movable stop end x2, which is in position at this time. This causes the projection U2 on plate U to crowd against the adjusting ear on plate S, to which is adjustably attached to and with the swinging tone-arm support, and, as fast as the projecting point t on the plate T recedes, it will cause the tone-arm to be pushed forward to a position so that the needle will be lowered in the proper position near the outer edge of the record to start playing the large record. As soon as the contact point UI comes in contact with the movable stop end x2 and the cam lever 3A is steadily moving forward, the weak spring T3 crowds back and holds the connecting rod T2 back so that the plate T will stop rotating forward for the time being and prevent the tone-arm from swinging too far forward, thus holding the tone-arm in this position until the needle is lowered to the record. By this time, the spring T3 has reached its limit of expansion and the plate T continues its rotation far enough so that it will not come in contact with the plate S at any time the needle is travelling the music grooves of any of the records. In other words, this spring T3 is for the purpose of preventing the tone-arm from swinging too far at the time it is being brought into position for playing. At this time, cam 5, see Fig. 21, has rotated far enough to permit roller 5B on cam lever 5A to travel down its decline and as the pressure is released by the action of cam lever 5A on the lever 5F, it will cause it to be tilted up at the back and away from the lever V2, see Fig. 5, in the swinging tone-arm support releasing the pressure on tail lever WI, see Fig. 22, of the tone-arm W and permit it to be lowered and in position to traverse the music grooves on the record. In case there is no record placed on the turn-table, the tone-arm and needle are permitted to drop only a limited amount or until the tail lever WI comes in contact with a hollowed portion of the upper part of the swinging tone-arm frame which is inside of the swinging tone-arm support. This part being stationary provides sufficient friction to prevent the tone-arm from swinging around when the needle is not traversing the record grooves.

Just before the needle has been lowered to the record, the cam 2 has rotated far enough so that the roller 2B traveled down the decline 2—b on cam 1, see Fig. 20, permitting the spring 2I to cause the bracket 2G, see Fig. 10, to rotate back to its normal position with the tail end of spring actuated dog 2H coming in contact with the projection a6 on plate A6 and causing the dog 2H to be raised high enough to clear the notches in plate B5 as shown in Fig. 10. Just after the needle is lowered to the record, the lever end k—2 of shifter fork K has reached the notch in cam 7, see Fig. 1, and the spring k—3 which is attached to this lever will cause sufficient pressure to pull this end forward and up into the notch and the fork ends will be crowded backwards and through its connections with the yoke H4 with clutch H will be crowded backwards until the clutch notches h2 are disengaged from the clutch notches J2 in worm sleeve J and causing also cam shafts L and M to stop rotating. The quick movement backward is stopped and prevented from clicking by a felt pad k—I, which is attached to a projecting ear k on the back part of the fork K. This felt pad k—I comes in contact with the upper portion of the frame A and prevents the fork K from traveling too far backwards.

Before the tone-arm is allowed to swing in position for playing the record, the cam 3, see Fig. 15, during its rotation, has permitted the roller 3—b on cam lever 3—a to travel down its decline a limited distance, shown in Fig. 15. Its downward action which is caused by its spring which has sufficient tension to pull the back end of shifter lever R down against the portion of the frame A which is low enough so that the latch-key R3 on rock shaft R4 will engage in the notch R2 in reverse lever R, holding the shifter end R1 up so as not to come in contact with the clutch H when the cam mechanism is stopped.

As the revolving magazine is rotated and stopped in the position so that the second and small record support is placed in a playing position on the floating disc over the turn-table, the roller x5 on the swinging bracket x4, see Figs. 2 and 8, has been pushed backwards and held in position by one of the high points on the periphery of plate B4. This causes endwise motion to rod x3 which is connected to the upper end of bracket x4 to swing movable stop lever X so that the contact point x2 will be out of position and permit plate U to be drawn forward until it comes in contact with the positive stop A9, shown in Fig. 5, and then the tone-arm will be crowded forward the proper distance so that the needle will be lowered in position to start playing on the small sized record in a similar way as described for playing the large records. Thus, it will be seen that in the operation of playing first large and then small records alternately, the tone-arm automatically is adjusted to each size record, and all records will be played first on one side in one revolution of the magazine, and on the second revolution the opposite sides of the records will be played. When the handle Q is placed in stop notch Q2, the first star point on plate N1 will be rotated far enough so that it will permit latch P1 to fall low enough to engage the catch 1D on cam lever 1A, see Fig. 12, thus preventing ratchet bracket 1G, see Fig. 10, from backing up far enough to allow the dog 1H, see Fig. 10, to engage in the first following notch of ratchet plate B1; therefore, killing the action of cam lever 1A. With the handle Q in notch Q2, the first star point on plate N8 will come in contact with the latch O—8, see Fig. 20, and raise it high enough so that it will not engage in the catch 8E on cam lever 8A and when the record playing mechanism has caused R3 to disengage end R2 of lever R as previously described, the roller 8B on cam lever 8A, see Fig. 20, will travel down the decline to a low position 8—f. This movement permits the spring 8—I to back up the cam bracket 8G sufficiently to allow its dog 8—H, see Fig. 11, to engage in the following notch in ratchet plate B8. As the cam 8 is rotated, see Fig. 20, the roller 8B on cam lever 8A rolls up the small incline 8a on cam 8 and crowds the cam lever 8A backwards a sufficient amount to rotate the revolving carrier about ⅝ of a space or until the record support and the record 10 which has just been played, is raised up to the position 10E, see Fig. 1, and as the roller E2, which is attached to segmental gear E, comes in contact with and partially passes the projection A5 on the frame A, see Figs. 3 and 4, it causes them to rotate the small gear E3 by its ratchet dog E4 and turn with and rotate record support D a half revolution, causing the record 10 to be turned bottomside up, as shown in dotted lines 10E in Fig. 1. By this time, the cam 8 is rotated far enough so that the roller 8b of cam lever 8A is traveling down the decline 8—a on cam 8. Roller 2B on cam lever 2A has started up the incline to a point on the periphery of 2—a of cam 2, see Fig. 19. As the roller in this comes to rest for the time being, the revolving carrier is only permitted to back up to a position so that the record which has just been played is about one inch above the floating disc, or in a position as high as shown in dotted lines 10C, see Fig. 1. Both cams 2 and 8, see Figs. 18 and 19, have rest positions 2—b and 8—b on their peripheries so that there will be no rotary movement to the revolving magazine while the shaft 4J and roller 4K are going through the motions which at other times would be swinging the record carrier into position over the turn-table and the roller 4K is permitted time to return to its normal position.

At this time, the roller 8b, see Fig. 20, is permitted to travel down the second decline of cam 8 to the lowest position on its periphery 8—c. The roller 2B on cam lever 2A, see Fig. 19, simultaneously comes in contact with the incline 2—b on cam 2 and causes the continuation of the backing up process so that the revolving magazine is backed up against the stop A8 as previously described and the record is placed in the position on the floating disc for playing on the second side. After the needle has traversed the grooves on the second side of the record 10 and has come in contact with the eccentric stop groove 10A, see Fig. 2, or reached the end of spiral groove 10B on another style record which is also shown in Fig. 2, or when playing other style records which have uniform stop grooves provided, which cause the mechanism to trip in a way previously described, and after the cam shaft L starts on its second revolution and cam shaft M on its second half revolution, cam 5 in its rotation causes cam lever 5A, see Fig. 21, to be pushed backward and its opposite end upward through its connections with its lever 5A by tilting the same, causing the tone-arm and needle to be lifted from the record. Cam 3 in its rotation causes the cam lever 3A, see Fig. 15 to be crowded back swinging the tone-arm clear of the record as shown in dotted lines (Figure 2) causing the plate I to turn and raise upward, raising with it the floating disc G3 and the record 10. Cam 6 in its rotation, as the roller 6B, see Fig. 24, comes in contact with the decline on cam 6 which permits the cam lever 6A to swing forward through its connections with spreading levers Z and Y and their fingers Z5 and Y5, the spring Z4 is permitted to draw the said spreading fingers together which allows the spring D2 to clamp the record 10 in the record support D1. At this time, the roller 8B on lever 8A, see Fig. 20, has come in contact and is traveling the incline to the point 8—d on the periphery on the cam 8 which causes the cam lever 8A to be crowded backward and its connecting rod 8F pulls and causes to turn ratchet bracket 8G, see Fig. 11, and as the spring actuated dog 8H comes in contact with the first notch in plate B8, it causes the revolving magazine B to rotate forward and upward at this time a little over one space. As the record support D is rotated upward, the roller E2 on segmental gear E comes in contact with stop A5 on frame A, see Figs. 1, 2, 3 and 4, and as it continues and is pushed downward and rotated far enough to permit the roller E2 to slip past on the back and inner side of stop A5, see Figs. 3 and 4. This motion of segmental gear E by its connections, small bevel gear E—3 and ratchet dog E4, causes the revolving record support D to turn on its journal a half revolution and thus turn the record 10 bottomside up the second time. These turning positions are shown by dotted lines 10D and 10E in Fig. 1. As the rotating magazine continues to rotate the roller C9 on its support $c^8$ comes in contact with the spiral A2 on frame A, see Figs. 3 and 4. As it travels upward, it causes the record support to turn as previously described so that the record is folded within the circle of the revolving magazine and held in place in that position by the stop pin C10 (Figure 28) which has engaged in one of the holes in plate C2. At the same time, the record that has just been played has been raised, the following record support which contains a small record has been raised up to the position shown in dotted lines 10C and is ready to be swung in position and back down to the playing position in the same way previously described. It will be seen that while the stop handle Q is adjusted in this position, Q2, just described, that the records will be played continuously, first on one side and then on the second side, and continue to play all of the records in the revolving magazine in that order, first the large and then the small records. When the handle Q is placed in the stop Q3, the first star point on plate N8 has been rotated far enough to release latch O8 so that it will engage in the catch 8E, the top part of cam lever 8A and as cam lever 9A has not yet been released, the action on both cam levers 8A and 9A is locked, and as the second star point on plate N1 has come in contact and raised latch P1 high enough to prevent it from engaging in either catch 1D or 1E on the upper part of cam lever 1A, this will permit the latter to have full motion and allow it to swing back and forward a little over two spaces or engage with its ratchet dog 1H in every other notch of the plate B1, see Fig. 11. After the needle has traversed the grooves of the record and the mechanism has tripped, and as the cam 1 is revolved, the roller 1B, see Fig. 12, comes in contact with the decline on cam 1, spring 1—1 draws the connecting rod 1F and cam lever 1A backward, see Fig. 12, causing the ratchet bracket 1G to rotate so that its ratchet dog 1H, see Fig. 11, engages in the second following notch of ratchet plate B1. At this time, cam 5, see Fig. 21, in its rotation has caused the tone-arm and needle to be raised from the record 10; cam 3, see Fig. 15, in its rotation has caused the tone-arm W to be swung backwards; also plate I has been rotated and raised upward and caused the floating disc G3 with the record 10 to raise in position, clamping fingers Z5 and $y$5 in the rotation of cam 6, see Fig. 24, permitting the lever 6A to swing forward. The spring Z4 causes the clamping fingers Z5 and $y$5 to come closer together, permitting the spring D2 to draw and clamp the record support D1 on record 10. At this time, the roller 1B, see Fig. 20, on cam lever 1A comes in contact with the incline of cam 1 and as cam 1 rotates, the lever 1A is pushed backwards. Through its connecting rod 1F, ratchet bracket 1G, see Fig. 11, and its ratchet dog 1H coming in contact with the first notch in plate B1, the revolving magazine B is caused to rotate a little more than two spaces, or so that the second following record support and its record clamped therein, which happens to be, in this instance, a large record, is brought up to the position shown in dotted lines 10C, see Fig. 1. The record that has just been played as it is carried upward by the record support D is also turned bottomside up as the roller E2 of segmental gear E comes in contact with and passes projection A5 on frame A, see Figs. 3 and 4, in the same way previously described. The roller C9, coming in contact with spiral cam projection A2 on frame A, causes the record support D to be folded inward, and, as the tail end E1 of segmental gear E is at this time projecting backwards and up so that it comes in contact with a projection A3 in the top portion of frame A, see Figs. 3 and 4, and as it passes this point of contact the tail E1 is pushed downward so that the segmental gear is rotated upward and the small gear E3 is rotated backwards far enough so that its ratchet dog E4 (Figure 29) engages in the lower and opposite notch of rotating record support D. The record continues to raise until it is finally stopped in the second space above the turn-table. At this time, the second following record which is in the position as shown in dotted lines 10C, see Fig. 1, is swung into position and backed up to a position above the turn-table and through the continuation of the cam movement it is also placed into the proper playing position, in the same way previously described. Thus it will be seen that when handle Q is placed in the stop Q3 that every other record in the revolving magazine will be played one side at a time and on their second side every other revolution of the revolving magazine, playing continuously. When handle Q is placed in the stop Q4, the plate N1 is rotated far enough to cause its long star point to disengage latch P1, which will then drop low enough to engage the catch 1D on upper portion of cam lever 1A, thus killing its action. Plate N8 is rotated far enough so that its second star point engages latch O—8, lifting and holding it up; also plate N9 is rotated so that its single star point comes in contact and lifts latch O9 so as to disengage the catch 9E on the upper portion of lever 9A. This permits the free movement of both levers 8A and 9A as cam shaft L turns on its first revolution; cam shaft M turns on its first half revolution. The record 10 is lifted from the turn-table only a sufficient amount to cause it to be turned over to the position shown in dotted lines 10E, see Fig. 1, and is then backed up to the turn-table and played on its opposite side in the same way previously described. On the second half of the revolution of the cam shaft M, after the tone-arm has been swung clear and the record 10 has been clamped in position, and as the cam 9 revolves, roller 9B, see Fig. 19, comes in contact with and travels up the incline to the periphery 9C on cam 9, causing cam lever 9A to swing backwards with its connecting rod 9F; the ratchet bracket 9G, see Fig. 11, is rotated forward, its ratchet dog 9H coming in contact with the first notch in ratchet plate B7, causing the revolving magazine to be rotated one space forward. At this time, roller 8b, see Fig. 20, has reached the incline on cam 8 and as it continues to rotate, roller 8b travels up said incline to the periphery point 8—d. This causes cam lever 8A also to swing backwards with its connecting rod 8—F; ratchet bracket 8—G is rotated and its ratchet dog 8H comes in contact with the first notch on plate B8, causing the revolving magazine to be rotated a second notch or a little more than two spaces, bringing the second record support with the record clamped therein up to the position shown in dotted lines 10C, see Fig. 1. The record 10 that has just been played on its second side by means of its clamping support is rotated upward a little more than two spaces and then backed up into and comes to rest in the second space as the second following record is placed above the turn-table and played. In view of the fact that there is only one notch in cam 9, the bracket 9A is only permitted to swing back on every other half revolution of the cam shaft M. This is to prevent it from interfering with the partial space movement of the revolving magazine at the time the record is raised up and turned over and backed down to be played on its second side, or, in other words, it is only permitted to operate every other time. Thus it will be seen that when the handle Q is placed in the stop Q4 that every other record in the revolving magazine will be played on both sides, playing continuously.

*General description of operation*

As certain differences of operation occur according to the adjustment of lever Q, it is desirable in tracing a description of the operation, to set forth the operations in the order of adjustment of lever Q from left to right, it being advisable to first state that when lever Q is at stop or notch Q1 the corresponding sides of all the records will be played in regular order in the first revolution of the magazine and then in the same order at the other side of the records in the second revolution of the magazine.

Now assume that initially a 12" record is upon the floating disk and that the latter is in operative or driving relation to the rotatable turn-table with the tone-arm in starting position and the needle thereof engaging the record on the disk and that the clamping arms D1 are in unclamped position. At this time it should first be understood that an automatically adjustable stop X2 (Figure 2) is permitted by a low point of cam B4 through lever X4 and rod x3 and action of spring x4 (Figure 8), to check the inward movement of the tone-arm which precedes the lowering movement of the latter for engagement with the starting or outer end of the playing groove of such record, and that such automatic stop is to be withdrawn by the following high point of said cam B4 turning with the magazine so that the fixed stop A9 may be ready to function when needed, to insure the proper starting position of the needle on the next or small record, to be played. It will also be noted that levers 8A and 9A are held inoperative or functionless, by the respective latches O8 and O9 and that lever 1A is permitted by its latch P1 to have limited movement only, that is only sufficient movement to effect one step or space rotation at a time, of the magazine. Now with the parts arranged as stated and the lever Q in first stop or notch Q1, a switch (not shown) is operated to start the motor, and the latter through worm shaft F, worm wheel F1 and shaft F2, imparts rotation to the table through shaft G1 and thereby effects the playing of the record. The rotation of the turn-table is continued as long as the motor is in operation, but this is not true of the floating disk and record thereon, as said disk at times is raised and held out of driving relation to the turn-table, as hereinafter appears.

When the needle has traversed inwardly for the full length of the playing groove of the record, it engages, for example, the eccentric groove 10A of the record, and said groove, through the needle, causes the tone-arm to first swing further inward toward the center of the record and then outward, and said inward and outward movements of the tone-arm are participated in by the horizontal plate S journaled on the vertical portion of the tone-arm support V. The outward movement of the tone-arm and plate S causes the notched edge of the latter to engage spring arm R5 of the rock shaft R4 to cause its arm R3 to swing backward and release the rear end of rock lever R. This lever, being of greater weight at its forward end, gravitates at such end when released and engages the spiral end H1 of the driven clutch H, and therefore crowds the latter to the right into part-way but operative engagement with the clutch end of worm sleeve J to rotate the same. The rotation of sleeve J, through its worm thread engaging worm wheel J1 on shaft L, rotates the latter, and said shaft through the intermeshing gears L2 and M1, rotates shaft M, the latter turning at half the speed of shaft L, and the rotation of the said shafts L and M imparts corresponding movement to the cams on said shafts.

Cam 7 on shaft L (Figures 1, 7 and 16) as will be noted by reference to Figure 1 particularly, rocks the shifter yoke K and the latter applies endwise pressure to the right on clutch H and causes the same to enter into deeper or full engagement with the clutch end of sleeve J, this action because the undercut wall of clutch member H is withdrawn from overlapping engagement with the lever, also freeing the front end of lever R from spiral H1, so that the lever may be returned or rocked back, as hereinafter explained, to its initial or inoperative position, and be relatched in such position by the arm R3 of the rock shaft R4. At the end of one revolution of shaft L, the notch in cam 7 thereon, (Figure 1) comes opposite the lower end of the yoke and permits spring k3 to reverse the operation of the shifter yoke and therefore withdraw clutch sleeve H from engagement with the clutch end of sleeve J, the result being that the rotation of the cam 7 and shafts L and M comes to an end. Incidental to the first operative action of the shifter yoke, that is the operation imparted thereto by the rotating cam 7, shaft L, through its cam 5, effects operation of cam lever 5A, and the latter rocks lever 5F and causes it to apply downward pressure on the end V2 of a bell crank lever to cause said lever by engagement with the tone-arm tail W1 (Figure 22), to swing the tone-arm in a vertical plane and thus lift its front end and the needle to inoperative position relative to the record. Immediately the tone-arm is thus operated, it swings horizontally outward relative to the center of the disk, through the action of cam 3 on shaft L, as said cam in operating lever 3A, (Figure 15) causes said lever to effect rotatable action of a plate T (Figures 15 and 38) journaled on the frame A around the axis of the vertical portion of the tone-arm, and said plate T causes outward movement of plate S, through its upwardly-projecting arm t coming in contact with the plate S, and then the depending ear on plate S, striking the extremity of arm U2, effects outward movement of plate U against the resistance of spring U3. Plate S in swinging outward causes the adjusting screw V5 extending through the depending ear 105 of said plate (and screwed into the threaded ear of the tone-arm support V), to effect outward rotation of the said tone-arm support and the tone-arm carried thereby. Shortly after this action, the roller of lever 3a on shaft P, rides down the decline of cam 3 through the pull of the spring 200, connecting one end of said lever 3a to the frame (see Figure 15). The lever 3a in this action depresses the rear or latch end R2 (Figure 7) of lever R until said end is automatically re-engaged by latch arm R3 of shaft R4, it being understood that the latch arm R3 stands through the force of gravity, in the path of downward movement of the end R2 of lever R, so that this re-engagement of the latch arm with the rear end of lever R shall be automatic when the rear end of said lever is depressed as explained. The cam lever 3A simultaneously with the outward swing of the tone-arm, effects rotation of plate I carrying the floating disk, through the connecting rod 3F and lever i1, and in such rotation the spiral notch engagement of plate I with the corresponding underlying part I3 of the frame A, effects upward movement of said plate I and thereby lifts the floating disk off and breaks the driving relation between the same and the turn-table, so that the floating disk and the record on the latter shall cease to rotate.

By the time the last operation occurs, cam 6 on shaft L, has rotated far enough to permit spring D2 (Figure 2) to effect the clamping of the clamp arms D1 upon opposite edges of the record. In the meantime cam 1 has rotated far enough to permit spring I1, through connecting rod 1F, to draw lever 1A back to the left, and cause ratchet pawl 1G (Figure 11) to move back or to the left and engage a tooth of plate B7 on the hollow shaft B1 forming the magazine hub. Continued rotation of cam 1 then reverses the operation of lever 1A and hence, through the engagement of the ratchet pawl 1G and ratchet plate B7, effects counter-clockwise rotation of the magazine a little more than one-twelfth of a revolution. This action also causes the clamp arms D1 rotatable with the magazine, to lift the engaged record off the turn-table, and, as the respective record support D rises, the clamp arms thereof and the record carried thereby are turned over or inverted (in a manner hereinbefore explained) and then the clamp arms are folded or swung back into the magazine in a direction approximately radial thereof, the swing of said disk being edgewise. As the clamp arms and the respective disk are thus folded, the arms are latched in such position by the spring-actuated locking pin C10 carried by the magazine and engaging a cavity in an arm C2 of shaft C1 (Figure 28). At the same time the next record support of the magazine is brought to the plane indicated by dotted lines 10C (Figure 1). As this position is attained the cam 1 at the highest point of its periphery, is engaging the roller of lever 1A, and hence holds the same at rest so that the rotation of the magazine ceases for a time, and during this period of rest, through the action of cam 4, lever 4A, connecting rod 4E, and vertical crank shaft 4J (on the frame A), on plate C2 of shaft C1 (journaled on the magazine and associated with the record support in question), the unfolding action occurs to swing the record edgewise and dispose it in a nearly horizontal position above the, at this time, elevated floating disk, and as the record attains the requisite position, the shoulder b3 (Figure 32) of plate C2, strikes a stop B3 on the magazine frame, and back or rebound action of the record is prevented by latch pin C10 engaging in a second cavity or hole (Figure 32) of plate C2. Cam 2 on the shaft L, and cam lever 2A, through connection with the reversing ratchet bracket 2G and ratchet plate B5, and retractile spring 2D (Figure 10), then causes the rotatable magazine to rotate backward or clockwise, as fast as cam 1 permits it, and thereby lower the record onto the floating disk, and by the time this occurs, cam 6 has rotated sufficiently to crowd lever 6a (Figure 24) backward and, through connections 6F (Figure 5) and arm 6G, effect operation of shafts Z1 and y1, to overcome the resistance of spring Z4 and effect the unclamping of the arms D1 from the record immediately after it is deposited on the floating disk.

Cam 3 continuing its rotation, permits lever 3A to swing back to normal position under the pull of two inclined springs I2 (Figures 1 and 2) on plate I (carrying the floating disk at this time), this action lowering plate I into interlocking engagement with the spiral notches I3 of frame A. Slightly before this lowering of plate I ends, the floating disk engages and is sustained solely by and upon the rotating turntable and revolves therewith. At the same time, through the pull of spring U3, plate U is rotated to crowd against plate S and force the support V for tone-arm to swing inward of the table until end U1 engages stationary or fixed stop A9 of the frame, it being understood that the record at this time on the floating disk, is of the small size. This arrest of plate U does not stop the tone-arm from swinging further inward by momentum, but such further movement is prevented by the, at this time, compressed spring T3 (Figure 15). As lever 3A is returning to normal position, the back pressure of spring T3 through plate T, on plate S is gradually withdrawn, and at the same time the tone-arm is pivotally lowered to playing engagement with the record, and as this occurs the lever 3A has attained its normal position (see full lines Figure 15) and thereby withdrawn the resistance of spring T3, so that the needle may be free to follow the playing groove of the record.

As the needle engages the record, the cam 7 (shaft L) has rotated far enough for the tooth of the shifter yoke K to be snapped into the cam notch, by spring k3 (Figure 1). This causes clutch H to be unclutched from clutch sleeve J, thus stopping all cam shaft motion but not interfering with the turntable rotation.

If the magazine contains one or more records, such as 10B, as disclosed at the left-hand end of Figure 2, that is a record ending in a spiral stoppage groove as distinguished from the eccentric groove 10a, the tone-arm will continue to swing inward and eventually the peg S1 depending from the plate S, will by pressure against crank arm R7, operate rock-shaft R4 and trip R3 from lever R. This action of course will follow with the use of any kind of record having a uniform stoppage groove or point.

When the playing of the small record is ended and the next (or large) record is automatically placed upon the turntable in the same manner and by the same instrumentalities that placed the small record thereon, the adjustable stop X is disposed between the fixed stop and the forward or stop end of plate U, so that the inward movement of the tone-arm shall be arrested with the needle over the outer or starting end of the playing groove of the large record.

*For playing both sides of each record in a single revolution of the magazine*

When lever Q is shifted to stop or notch Q2, latch P1 is permitted by the engaging star plate, to drop to shoulder 1D on lever 1A, to hold the lever practically inoperative except to respond to the decline 1b of cam 1, this being necessary for the back or reverse rotation of the magazine for the deposit of the records onto the turn-table. The positioning of lever Q as explained, also causes one of the points of plate N8 on shaft N, to lift latch O8, to free lever 8A, so that cam 8 in its first half revolution, can function on said lever to permit the magazine to be turned to raise a record from the floating disk, nearly one space and turn it over and permit it to be backed down by cam 2 for playing the second side. On the second half revolution of cam 8, it moves the magazine more than a full step, and brings the next or following record to such height that when the clamp arms D1 are unfolded, the record is above the plane of the floating disk and ready to be lowered by cam 2 into playing position. Simultaneously with the bringing of the second record to a position above the floating disk, the previously played record is lifted, turned over and folded back into the magazine in the manner already described. It will thus be seen that lever Q in its second position accomplishes the same result as secured when the lever is at stop Q1, and the additional result of inverting each record after one side is played and then lowering it and playing the other side of the record.

*For playing alternately spaced records on one side only in one revolution and the other side of same records in the next revolution*

By placing handle Q at stop Q3, catch O8 is lowered and nullifies action of lever 8A and incidentally re-elevates latch P1 by star point N1, high enough to entirely free lever 1A. This permits spring 11 (Figure 11) to back-up lever 1A sufficiently to cause ratchet bracket 1G to engage in every other notch of ratchet plate B7 (see Figure 11), so that it can impart motion of a little more than two steps at a time to the magazine, and hence make provision for skipping one record with each step of the magazine, the corresponding sides of the records being played in one revolution and the other sides on the next revolution.

*To play each alternate record on both sides in sequence in one revolution*

The shifting of lever Q to Q4 (from any previous setting point), rotates selector shaft N, to move plate N1 far enough to permit latch P1 to engage catch 1D on lever 1A, and nullify the action of the latter, as before explained. It also causes the second point of plate N8 to lift latch O8 and free action of lever 8A, and the point of plate N9 to lift latch O9, and free lever 9A. In the first half revolution of cam 8, the lever 8A swings slightly to the left under the pull of spring 81, to allow ratchet dog 8H to back up one notch on bracket B8. Immediately thereafter roller 8B on lever 8A, climbs the first incline of cam 8, from 8a to point 8b (Figure 20), and effects the turning of the magazine and the lifting of the record from the floating disk nearly one space—high enough for it to be turned over,—which is effected as hereinbefore explained. While the roller 8B descends decline 8b, the cam 2 operates lever 2A to reverse the rotation of the magazine until the inverted record is placed upon the floating disk for the playing of the other side.

After the second side is played, and the cam shafts L and M are in operation, cam 9 permits spring 91 to draw lever 9A to the left to permit ratchet pawl 9H to back up far enough to catch the adjacent notch in B6. The climb of the roller of lever 9A to point 9c on cam 9, causes the magazine to turn counter-clockwise one step or space, thereby raising the played record from the floating disk until it is turned over and folded into the magazine, as hereinafter described. The roller on lever 8A then travels up incline on cam 8 to 8d. This effects the revolution of the magazine a little more than a space to bring the next alternate record to the dotted line 10c. As the cam turns from 8d to 8c, the record support is unfolded, and as said roller goes down from 8c to a rest on the concentric surface of the cam 8, the cam 2 is permitted to rotate the magazine backward and deposit the record on the floating disk. The record is then released by the operation of the clamp support, and as this occurs, the yoke disengages clutch H from sleeve J, and the cam shafts are arrested, it being noted that the roller on lever 8A, now is in the initial position with respect to cam 8 as shown by Figure 20, and that lever 9A is at rest as shown by Figure 19. All future actions are repetitions of those above described as long as lever Q remains at stop Q4, it being noted that until said lever is shifted, the large or small records, as the case may be, will be played, as the type of record on the turntable at the time the lever is shifted to stop Q4, will continue to be played until the attendant shifts the lever to another stop point.

Therefore, having thus fully shown and described my invention, so that others may utilize the same, I do not desire to be limited to the exact construction shown and described, as many modifications can be made therein without departing from the scope of the invention, what I claim as new and desire to secure by Letters Patent is:

1. In an apparatus of the class described, a revolving magazine, swinging and rotating record supports pivoted on said magazine, means to rotate said magazine, means to cause said records to swing outside of the circumference of said magazine, means to cause said record supports to revolve on their pivoted axes, and means to cause said record supports to fold back within the circumference of said magazine.

2. In an apparatus of the class described, a rotary magazine, means to rotate said magazine step by step, means for stopping and rotating the magazine backward, means for limiting said backward motion, record disc supports pivoted on said rotary magazine, means to swing each disc record support outward from the hub of said magazine as the support attains a particular point in the travel of the magazine, and means for rotating said record disc support after it has been swung outward.

3. In an apparatus of the class described, a record disc, means to rotate the same, a record disc revolving magazine, a hub to support the same, ratchet discs secured on said hub, ratchet dogs to engage said discs, cam actuated levers, connecting rods connecting said cam actuated levers and said dogs, and adjusting mechanism to control the action of said cam-actuated levers whereby particular dogs will be caused to rotate the magazine in different directions and different distances.

4. In an apparatus of the class described, a record disc, means to rotate the same, a record disc revolving magazine, a hub to support the same, a ratchet secured on said hub, teeth thereon adapted to rotate said magazine, in a clockwise movement, another ratchet on said hub adapted to rotate said magazine in an anti-clockwise movement, dogs to engage said ratchets to rotate said magazine in the desired direction, a plurality of cam actuated levers, connecting rods connecting said levers, and said dogs, and adjustable means to select the lever desired to be operated, whereby said magazine will be operated in the desired direction and the desired distance.

5. In an apparatus of the class described, a frame, an axle thereon, a rotatable magazine, a hub therefor mounted on said axle, a cam secured on said hub, a rock shaft mounted on said frame, a spring pressed lever secured on said rock shaft, a roller mounted on said lever and engaging said cam, a movable tone-arm, a permanent and a movable stop therefor, and a connecting rod between said cam controlled lever and said movable stop, whereby the latter will be moved out of position and permit said tone-arm to be stopped by the permanent stop.

6. In an apparatus of the class described, a frame, an axle thereon, a rotary magazine, a hub thereon mounted on said axle, a ratchet plate secured on said hub, a spring-actuated dog adapted to engage said teeth to operate the ratchet plate, a cam actuated lever, a rod connecting said cam actuated lever and said spring actuated dog to move said magazine clockwise, and adjustable means to control the length of movement of said cam-actuated lever to turn the magazine a predetermined degree in its clockwise movement.

7. In an apparatus of the class described, a frame, an axle secured on said frame, a rotatable magazine, a hub thereon mounted on said axle, a ratchet plate secured on said hub, a spring pressed dog to engage said teeth, a cam actuated lever, a connecting rod between said cam actuated lever and said spring pressed dog, and adjustable mechanism whereby said cam actuated lever is caused to operate said dog to impart counter-clockwise movement to the ratchet plate and magazine a distance equal to the length of one or two teeth of said plate.

8. In an apparatus of the class described, a frame, an axle secured thereon, a rotary magazine, ratchet wheels secured on the hub of said magazine, spring actuated dogs to operate said ratchets in either direction, a plurality of cam actuated levers, rods connecting said levers and said spring actuated dogs, selective mechanism adapted to control the action of said cam actuated levers whereby said magazine will be rotated clockwise or anti-clockwise and as far as may be desired.

9. In an automatic phonograph, a rotating vertical spindle, a turntable rotatable therewith, a floating disk fitting loosely on the spindle, underlying means for holding the disk above and spaced from the turntable, a pivotally supported record carrier, means to swing the carrier to dispose the record above said disk, means to effect the lowering of the carrier to dispose the record upon the spindle and floating disk, means to disengage the carrier from the record, and means to cause the holding means to dispose the disk upon the turntable for rotation thereby and to withdraw from engagement with the disk.

10. In an automatic phonograph, a rotating vertical spindle, a turntable rotatable therewith, a floating disk fitting loosely on the spindle, means for holding the disk above and spaced from the turntable, a carrier for and yieldingly clamped upon a playing record, means for swinging the carrier to dispose the record in a position above the floating disk, means to effect the lowering of the carrier until the record fits upon the spindle and flatly on the disk, and means to unclamp the carrier from the record.

11. In an automatic phonograph, a rotating vertical spindle, a turntable rotatable therewith, a floating disk fitting loosely on the spindle, means for holding the disk above and spaced from the turntable, a carrier for and yieldingly clamped upon a playing record, means for swinging the carrier to dispose the record in a position above the floating disk, means to effect the lowering of the carrier until the record fits upon the spindle and flatly on the disk, means to unclamp the carrier from the record, and means to cause the disk-holding means to lower the disk upon the turntable and then withdraw from engagement with the disk to leave the latter free to turn with the turntable.

12. In an automatic phonograph, a rotating spindle, a turntable upon and rotated by the spindle, a floating disk fitting loosely on the spindle, a lift-plate for raising and lowering the disk, a magazine, means for imparting intermittent rotary movement in a single direction to the magazine, a series of record carriers arranged approximately radially of the magazine and pivoted thereto for unfolding and folding movement to dispose the respective records above the floating disk or withdraw them from such position, and means for effecting reverse rotation of the magazine when a carrier thereof is unfolded to cause the latter to fit its record upon the spindle and floating disk.

13. In an automatic phonograph, a rotating spindle, a turntable upon and rotated by the spindle, a floating disk fitting loosely on the spindle, a lift-plate for raising and lowering the disk, a magazine, means for imparting intermittent rotation in a single direction to the magazine, a series of record carriers arranged approximately radially of the magazine and pivoted thereto for unfolding and folding movement to dispose the respective records above the floating disk or withdraw them from such position, means for effecting reverse rotation of the magazine when a carrier thereof is unfolded to cause the latter to fit its record upon the spindle and floating disk, and means to disengage the carrier from the record.

14. In an automatic phonograph, a rotating spindle, a turntable upon and rotated by the spindle, a floating disk fitting loosely on the spindle, a lift-plate for raising and lowering the disk, a magazine, means for imparting intermittent rotation in a single direction to the magazine, a series of record carriers arranged approximately radially of the magazine and pivoted thereto for unfolding and folding movement, to dispose the respective records above the floating disk or withdraw them from such position, means for effecting reverse rotation of the magazine when a carrier thereof is unfolded to cause the latter to fit its record upon the spindle and floating disk, means to disengage the carrier from the record, and means to lower the lift plate until the floating disk rests flatly on the turntable.

15. In an automatic phonograph, a rotating spindle, a turntable upon and rotated by the spindle, a floating disk fitting loosely on the spindle, a lift-plate for raising and lowering the disk, a magazine, means for imparting intermittent rotation in a single direction to the magazine, a series of record carriers arranged approximately radially of the magazine and pivoted thereto for unfolding and folding movement to dispose the respective records above the floating disk or withdraw them from such position, means for effecting reverse rotation of the magazine when a carrier thereof is unfolded to cause the latter to fit its record upon the spindle and floating disk, means to disengage the carrier from the record, means to lower the lift-plate until the floating disk rests flatly on the turntable, means, after the playing of a record is completed, to elevate the floating disk, and means to re-engage the carrier with the record on the elevated disk.

16. In an automatic phonograph, a frame having cam teeth, a driven spindle suitably journaled, a turntable rotatable therewith above said teeth, a circular lift-plate having cam teeth for cooperation with the teeth of the frame, and means to impart turning movement to the lift-plate to cause said cooperating teeth to elevate the plate to a plane above that of the turntable.

17. In an automatic phonograph, a frame having cam teeth, a driven spindle suitably journaled, a turntable rotatable therewith above said teeth, a circular lift-plate having cam teeth for cooperation with the teeth of the frame, means to impart turning movement to the lift-plate to cause said cooperating teeth to elevate the plate to a plane above that of the turntable, and means for reversing the turning movement of the lift-plate to lower it to a plane below that of the turntable.

18. In an automatic phonograph, a frame having cam teeth, a driven spindle suitably journaled, a turntable rotatable therewith above said teeth, a circular lift-plate having cam teeth for cooperation with the teeth of the frame, means to impart turning movement to the lift-plate to cause said cooperating teeth to elevate the plate to a plane above that of the turntable, and yielding means for resisting the turning lifting movement of the lift-plate and for reacting to reverse such turning movement of said plate and relower it to its original position.

19. In an automatic phonograph, a frame having cam teeth, a driven spindle suitably journaled, a turntable rotatable therewith above said teeth, a circular lift-plate having cam teeth for cooperation with the teeth of the frame, means to impart turning movement to the lift-plate to cause said cooperating teeth to elevate the plate to a plane above that of the turntable, and a pair of retractile springs connecting the lift-plate with the frame to resist the turning and upward movement of the lift-plate and to react to restore the lift-plate to its original position.

20. In an automatic phonograph, a frame having cam teeth, a driven spindle suitably journaled, a turntable rotatable therewith above said teeth, a circular lift-plate having cam teeth for cooperation with the teeth of the frame, means to impart turning movement to the lift plate to cause said cooperating teeth to elevate the plate to a plane above that of the turntable, a floating disk fitting loosely on the spindle and resting flatly on the turntable when the lift plate is in lowered position and adapted to be spaced from and above the turntable when in elevated position.

21. In an automatic phonograph, a rotating turntable, an intermittently rotating magazine, and a series of record carriers mounted on and movable circularly with the magazine and each pivoted thereto for swinging movement in a plane substantially radial of the axis of the magazine toward the axis thereof to dispose its respective record therein or away from the axis of the magazine to dispose its record exteriorly of the magazine and above the turntable.

22. In an automatic phonograph, a rotating turntable, an intermittently rotating magazine, and a series of record carriers mounted on and movable circularly with the magazine and each pivoted thereto for swinging movement in a plane substantially radial of the axis of the magazine toward the axis thereof to dispose its respective record therein or away from the axis of the magazine to dispose its record exteriorly of the magazine and above the turntable, each carrier also being journaled for turning around an axis diametric of its respective record to invert the same.

23. In an automatic phonograph, a frame, an intermittently rotatable circular magazine journaled thereon, and a series of spaced record carriers, each comprising a rock shaft journaled on the magazine and provided with an arm, a yieldingly-actuated catch to lock the shaft in either of two rotatable positions relative to the magazine, a sleeve journaled on the arm, a pair of oppositely-bowed grippers pivotally carried by the sleeve, and a spring connecting the free ends of the grippers for clamping the latter upon opposite edges of a playing record for the support thereof.

24. In an automatic phonograph, a frame, an intermittently rotatable circular magazine journaled thereon, and a series of spaced record carriers, each comprising a rock shaft journaled on the magazine and provided with a plate, a yieldingly-actuated catch to lock the shaft in either of two rotatable positions relative to the magazine, and cam-actuated means to engage the said plate and effect turning movement of said shaft when the magazine is at rest.

25. In an automatic phonograph, a frame, an intermittently rotatable circular magazine journaled thereon, and a series of spaced record carriers, each comprising a rock shaft journaled on the magazine and provided with a plate, a yieldingly-actuated catch to lock the shaft in either of two rotatable positions relative to the magazine, cam-actuated means to engage the said plate and effect turning movement of said shaft when the magazine is at rest, and means to restore said cam-actuated means to its original position.

26. In an automatic phonograph, a frame, an intermittently rotatable circular magazine journaled thereon, and a series of spaced record carriers, each comprising a rock shaft journaled on the magazine and provided with a plate, a yieldingly-actuated catch to lock the shaft in either of two rotatable positions relative to the magazine, cam-actuated means to engage the said plate and effect turning movement of said shaft when the magazine is at rest, means to restore said cam-actuated means to its original position, means to effect back rotation of the cam, and a stop on the frame and a projection on said plate to engage said stop and arrest back rotation.

27. In an automatic phonograph, a frame, a rotating shaft, a circular magazine journaled thereon, a series of spaced record carriers pivotally mounted on the magazine for swinging approximately radially thereof to dispose the respective records within or without the peripheral margin of the magazine, means to rotate the magazine one step, and means actuated by said rotating shaft to swing a carrier to dispose the respective record beyond the periphery of the magazine.

28. In an automatic phonograph, a frame a rotating shaft, a circular magazine journaled thereon, a series of spaced record carriers pivotally mounted on the magazine for swinging approximately radially thereof to dispose the respective records within or without the peripheral margin of the magazine, means to rotate the magazine one step, means actuated by said rotating shaft to swing a carrier to dispose the respective record beyond the periphery of the magazine, and means to impart another step to the magazine in the same direction but of shorter length than the first step.

29. In an automatic phonograph, a frame, a rotating shaft, a circular magazine journaled thereon, a series of spaced record carriers pivotally mounted on the magazine for swinging approximately radially thereof to dispose the respective records within or without the peripheral margin of the magazine, means to rotate the magazine one step, means actuated by said rotating shaft to swing a carrier to dispose the respective record beyond the periphery of the magazine, means to impart another step to the magazine in the same direction but of shorter length than the first step, and means actuated by the frame during the second step movement of the magazine to cause the carrier to make a half turn and invert the said record.

30. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior to the magazine, means actuated by the frame upon a counter-clockwise turning movement of the magazine for the positioning of the grippers exterior to the magazine for imparting a half rotation to the grippers to effect inversion of the record, and means in geared relation to the spindle for effecting the release of the record from the grippers.

31. In an automatic phonograph, a frame, an intermittently rotatable circular magazine journaled thereon, and a series of spaced record carriers, each comprising a rock shaft journaled on the magazine and provided with an arm, a yieldingly-actuated catch to lock the shaft in either of two rotatable positions relative to the magazine, a sleeve journaled on the arm, a pair of oppositely-bowed grippers pivotally carried by the sleeve, a spring connecting the free ends of the grippers for clamping the latter upon opposite edges of a playing record for the support thereof, and means actuated by contact with the frame under rotation of the magazine, for rotating the sleeve to effect inversion of the playing record.

32. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, and means for applying pressure on the tail of said plate when the magazine is stationary, to turn said shaft and swing the grippers from a position within to a position exterior to the magazine.

33. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior to the magazine, and an arm rigid with the shaft for action by the frame upon a subsequent similar step of the magazine to effect reverse turning movement of said shaft to swing the grippers back to their original position within the magazine.

34. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior to the magazine, and means actuated by the frame upon a counter-clockwise turning movement of the magazine in the position of the grippers exterior to the magazine, for imparting a half rotation to the grippers to effect inversion of the record.

35. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior to the magazine, means actuated by the frame upon a counter-clockwise turning movement of the magazine following the positioning of the grippers exterior to the magazine, for imparting a half rotation to the grippers to effect inversion of the record, and means for effecting a reverse rotative step of the magazine while the grippers and the record occupy said inverted position.

36. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior the magazine, means actuated by the frame upon a counter-clockwise turning movement of the magazine following the positioning of the grippers exterior to the magazine, for imparting a half rotation to the grippers to effect inversion of the record, a rotating shaft, and means actuated thereby to effect reverse turning movement of the magazine.

37. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior to the magazine, means actuated by the frame upon a counter-clockwise turning movement of the magazine following the positioning of the grippers exterior to the magazine, for imparting a half rotation to the grippers to effect inversion of the record, a rotating shaft, means actuated thereby to effect reverse turning movement of the magazine, and a floating disk underlying the record for the support thereof when lowered.

38. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior the magazine, means actuated by the frame upon a counter-clockwise turning movement of the magazine following the positioning of the grippers exterior to the magazine, for imparting a half rotation to the grippers to effect inversion of the record, a rotating shaft, means actuated thereby to effect reverse rotation of the magazine, a floating disk underlying and to receive the record when lowered, means to disengage the grippers from the record, a driven turntable, means to lower the disk thereon, a tone arm equipment for engaging and playing the record, means for withdrawing the tone arm equipment from engagement with the record, means for lifting the floating disk off the turntable, and means for causing the grippers to re-engage the record before the next counter-clockwise movement of the magazine.

39. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary, to turn said shaft and swing the grippers from a position within to a position exterior the magazine, means actuated by the frame upon a counter-clockwise turning movement of the magazine following the positioning of the grippers exterior to the magazine, for imparting a half rotation to the grippers to effect inversion of the record, a rotating shaft, means actuated thereby to effect reverse rotation of the magazine, a vertical spindle driven from said shaft, a floating horizontal disk on the spindle underlying and to receive the record when lowered, means to disengage the grippers from the record, a driven turntable, means to lower the disk thereon, a tone arm equipment for engaging and playing the record, means for withdrawing the tone arm equipment from engagement with the record, means for lifting the floating disk off the turntable, means for causing the grippers to re-engage the record before the next counter-clockwise movement of the magazine, and means to impart an advance step to the magazine of greater length and said preceding advance step thereof to re-elevate the floating disk off the turntable and spindle.

40. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary to turn said shaft and swing the grippers from a position within to a position exterior the magazine, means actuated by the frame upon a counter-clockwise turning movement of the magazine following the positioning of the grippers exterior to the magazine, for imparting a half rotation to the grippers to effect inversion of the record, a rotating shaft, means actuated thereby to effect reverse rotation of the magazine, a vertical spindle driven from said shaft, a floating horizontal disk on the spindle underlying and to receive the record when lowered, means to disengage the grippers from the record, a driven turntable, means to lower the disk thereon, a tone arm equipment for engaging and playing the record, means for withdrawing the tone arm equipment from engagement with the record, means for lifting the floating disk off the turntable, means for causing the grippers to re-engage the record before the next counter-clockwise movement of the magazine, means to impart an advance step to the magazine of greater length than said preceding advance step thereof to re-elevate the floating disk off the turntable and spindle, and means to cause the grippers to re-engage and support the record and lift if off the spindle during said last-mentioned step of the magazine.

41. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft in either of two rotative positions relative to the magazine, a pair of oppositely-bowed grippers supported from the said shaft, a spring connecting the free ends of the grippers for clamping them upon opposite edges of a playing record, means for applying pressure on the tail of said plate when the magazine is stationary to turn said shaft and swing the grippers from a position within to a position exterior the magazine, means actuated by the frame upon a counter-clockwise turning movement of the magazine following the positioning of the grippers exterior to the magazine for imparting a half rotation to the grippers to effect inversion of the record, a rotating shaft, means actuated thereby to effect reverse rotation of the magazine, a vertical spindle driven from said shaft, a floating horizontal disk on the spindle underlying and to receive the record when lowered, means to disengage the grippers from the record, a driven turntable, means to lower the disk thereon, a tone arm equipment for engaging and playing the record, means for withdrawing the tone arm equipment from engagement with the record, means for lifting the floating disk off the turntable, means for causing the grippers to reengage the record before the next counter-clockwise movement of the magazine, means to impart an advance step to the magazine of greater length than said preceding advance step thereof to re-elevate the floating disk off the turntable and spindle, means to cause the grippers to re-engage and support the record and lift it off the spindle during said last-mentioned step of the magazine, and means actuated by the frame for again imparting a half rotation to the grippers to reinvert and to restore the record to its original position relative to the magazine.

42. In an automatic phonograph, a frame, a rotatable circular magazine journaled thereon for counter-clockwise step movement, and a series of record carriers, each comprising a rock shaft journaled on the magazine and provided with an arm and with a plate having a tail portion, a yieldingly-actuated catch to lock the shaft, in either of two rotative positions relative to the magazine, a pair of oppositely-bowed grippers supported from said shaft, a spring connecting the free ends of the grippers for clamping them upon opposite edges of a playing record, means for applying pressure on the tail of said plate when the magazine is stationary to turn said shaft and swing the grippers from a position within to a position exterior the magazine, means actuated by the frame upon a counter-clockwise turning movement of the magazine following the positioning of the grippers exterior to the magazine for imparting a half rotation to the grippers to effect inversion of the record, a rotating shaft, means actuated thereby to effect reverse rotation of the magazine, a vertical spindle driven from said shaft, a floating horizontal disk on the spindle underlying and to receive the record when lowered, means to disengage the grippers from the record, a driven turntable, means to lower the disk thereon, a tone arm equipment for engaging and playing the record, means for withdrawing the tone arm equipment from engagement with the record, means for lifting the floating disk off the turntable, means for causing the grippers to re-engage the record before the next counter-clockwise movement of the magazine, means to impart an advance step to the magazine of greater length than said preceding advance step thereof to re-elevate the floating disk off the turntable and spindle, means actuated by the frame for again imparting a half rotation to the grippers to reinvert and restore the record to its original position to the magazine, and means to refold the carrier to dispose the grippers and record within the magazine.

43. The combination of a shaft for intermittent operation, a rotary magazine, a constantly driven spindle and turntable, a floating disk upon the spindle and turntable and rotated thereby and carrying and revolving a playing record loosely fitting the spindle, a swinging tone arm having a needle engaging the record, means actuated by movement of the tone arm imparted to the needle by the record as the playing thereof is completed, to lift the floating disk off the turn-table, means thereafter to turn said shaft, and means actuated thereby to impart a counter-clockwise movement to the magazine while the disk is out of contact with the turn-table.

44. The combination of a shaft for intermittent operation, a rotary magazine, a constantly driven spindle and turntable, a floating disk upon the spindle and turntable and rotated thereby and carrying and revolving a playing record loosely fitting the spindle, a swinging tone arm having a needle engaging the record, means actuated by movement of the tone arm imparted to the needle by the record as the playing thereof is completed, to lift the floating disk off the turn-table, means thereafter to turn said shaft, means actuated thereby to impart counter-clockwise movement to the magazine, while the disk is out of contact with the turn-table and means to tilt the tone arm to raise the needle off the record prior to the said counter-clockwise movement of the magazine.

45. The combination of a shaft for intermittent operation, a rotary magazine, a constantly driven spindle and turntable, a floating disk upon the spindle and turntable and rotated thereby and carrying and revolving a playing record loosely fitting the spindle, a swinging tone arm having a needle engaging the record, means actuated by movement of the tone arm imparted to the needle by the record as the playing thereof is completed, to lift the floating disk off the turntable, means thereafter to turn said shaft, means actuated thereby to impart a counter-clockwise movement to the magazine, while the disk is out of contact with the turn-table means to tilt the tone arm to raise the needle off the record prior to the said counter-clockwise movement of the magazine, and means actuated by said shaft for swinging the tone arm to dispose the needle beyond the periphery of the record.

46. In an automatic phonograph, a frame, an intermittently rotating cam wheel thereon having a series of alternately disposed points which are higher and lower relative to the axis of the cam, a tone arm mounted for swinging movement, fixed and movable stops in the path of movement in one direction of the tone arm to arrest the same at different points, means actuated by engagement with each high point of the cam to dispose the movable stop in the path of the tone arm movement, and means for moving said first-named means toward each low point of the cam as such point is presented, to trip the movable stop from said path to permit the tone arm to swing further inward relative to the axis of the record.

47. In an automatic phonograph, a frame, a rotary magazine, means to turn the same step by step, a shaft journaled on the frame near the periphery of the magazine and provided with a pair of crank arms, a rotatable cam, a lever movable in one direction by said cam, a link pivotally connecting the lever and one of said crank arms, a rock shaft journaled on the magazine, provided with a tail piece to be engaged by the other of said crank arms and turned at the end of each regular step movement of the magazine to rotate the shaft carried by the latter, and means to return the rock shaft to its original position after each operation thereof effected by said cam.

48. In an automatic phonograph, a frame, a rotary magazine, means to turn the same step by step, a shaft journaled on the frame near the periphery of the magazine and provided with a pair of crank arms, a rotatable cam, a lever movable in one direction by said cam, a link pivotally connecting the lever and one of said crank arms, a rock shaft journaled on the magazine, provided with a tail piece to be engaged by the other of said crank arms and turned at the end of each regular step movement of the magazine to rotate the shaft carried by the latter, means to return the rock shaft to its original position after each operation thereof effected by said cam, a record carrier on the shaft carried by the magazine to be swung outward by the turning movement of the shaft carried by the magazine, and a floating disk over which the carrier disposes the record at the end of said swinging movement.

49. In an automatic phonograph, a frame, a rotary magazine, means to turn the same step by step, a shaft journaled on the frame near the periphery of the magazine and provided with a pair of crank arms, a rotatable cam, a lever movable in one direction by said cam, a link pivotally connecting the lever and one of said crank arms, a rock shaft journaled on the magazine, provided with a tail piece to be engaged by the other of the said crank arms and turned at the end of each regular step movement of the magazine to rotate the shaft carried by the latter, means to return the rock shaft to its original position after each operation thereof effected by said cam, a record carrier on the shaft carried by the magazine to be swung outward by the turning movement of the shaft carried by the magazine, a floating disk over which the carrier disposes the record at the end of said swinging movement, and yielding means to lock the shaft when the record is disposed for alinement with the center of the floating disk.

50. In an automatic phonograph, a suitable frame, a driven shaft therein, a spindle driven thereby, a turntable on the spindle, a second shaft, a clutch member rotatable with the driven shaft, and slidable thereon, a journaled clutch member in gear with the second shaft, means for sliding the first-named clutch member into partial but operative engagement between the clutch members, means for normally holding the first-named means inoperative, a tone arm having a needle to engage the groove of a playing record rotatable with the turntable, means actuated by movement imparted to the needle by the record when the playing thereof is completed, to trip the first-named means free from the other means to permit the former to effect said partial clutching engagement between the clutch members and rotation of the second shaft and means actuated by the second shaft for effecting full clutch engagement and the disengagement of the slidable clutch member from the means for sliding said clutch member.

51. In an automatic phonograph, a suitable frame, a driven shaft therein, a spindle driven thereby, a turntable on the spindle, a second shaft, a clutch member rotatable with the driven shaft, and slidable thereon, a journaled clutch member in gear with the second shaft, means for sliding the first-named clutch-member into partial but operative engagement between the clutch members, means for normally holding the first-named means inoperative, a tone arm having a needle to engage the groove of a playing record rotatable with the turntable, means actuated by movement imparted to the needle by the record when the playing thereof is completed, to trip the first-named means free from the other means to permit the former to effect said partial clutching engagement between the clutch members and rotation of the second shaft, means actuated by the second shaft for effecting full clutch engagement and the disengagement of the slidable clutch member from the means for sliding said clutch member and means actuated from the second shaft to tilt the tone arm and thereby lift the needle from the played record.

52. In an automatic phonograph, a suitable frame, a driven shaft therein, a spindle driven thereby, a turntable on the spindle, a second shaft, a clutch member rotatable with the driven shaft, and slidable thereon, a journaled clutch member in gear with the second shaft, means for sliding the first-named clutch member into partial but operative engagement between the clutch members, means for normally holding the first-named means inoperative, a tone arm having a needle to engage the groove of a playing record rotatable with the turntable, means actuated by movement imparted to the needle by the record when the playing thereof is completed, to trip the first-named means free from the other means to permit the former to effect said partial clutching engagement between the clutch members and rotation of the second shaft, means actuated by the second shaft for effecting full clutch engagement and the disengagement of the slidable clutch member from the means for sliding said clutch member, means actuated by the second shaft to tilt the tone arm and thereby lift the needle from the played record, and means actuated from said second shaft to swing the pivoted tone arm to dispose its free end and the needle beyond the circumferential plane of the record.

53. In an automatic phonograph, a frame, a magazine journaled thereon, a ratchet wheel rotatable with the magazine, a bracket rotatable coaxially with the magazine, a dog pivoted to the bracket for engagement with the ratchet wheel, a knuckle pivoted to the bracket, a lever, a rod pivotally connected to the lever and fitted to the knuckle for sliding movement in one direction, a spring for moving the rod reversely and for turning the bracket counter-clockwise, a retractile spring connecting the rod and bracket to yield to permit the sliding movement and react to abut the rod against the knuckle, and means at the end of the counter-clockwise movement of the bracket for tripping the dog from the ratchet wheel.

54. In an automatic phonograph, a frame, a magazine journaled thereon, a ratchet wheel rotatable with the magazine, a bracket rotatable coaxially with the magazine, a dog pivoted to the bracket for engagement with the ratchet wheel, a knuckle pivoted to the bracket, a rotatable cam, a lever for operation by said cam, a rod pivotally connected to the lever and fitted to the knuckle for sliding movement in one direction, a spring for moving the rod reversely and for turning the bracket counter-clockwise, a retractile spring connecting the rod and bracket to yield to permit the sliding movement and react to abut the rod against the knuckle, means at the end of the counter-clockwise movement of the bracket for tripping the dog from the ratchet wheel, and means actuated by a second wheel rotatable with the first cam, to effect counter-clockwise movement of the magazine.

55. In an automatic phonograph, a frame, a rotary magazine mounted thereon and provided peripherially with a shaft, a record carrier secured on said shaft, and normally holding a record within the plane of the periphery of the magazine and approximately radially thereof, means for turning the magazine step by step in a counterclockwise direction, a plate secured to said shaft, cam-actuated means to apply force on said plate at the end of a step movement of the magazine to turn said shaft, and means for limiting the turning movement.

56. In an automatic phonograph, a frame, a rotary magazine mounted thereon and provided peripherally with a shaft, a record carrier secured on said shaft and normally holding a record within the plane of the periphery of the magazine and approximately radially thereof, means for turning the magazine step by step in a counterclockwise direction, a plate secured to said shaft, cam-actuated means to apply force on said plate at the end of a step movement of the magazine to turn said shaft, means for limiting the turning movement, and means to effect back rotation of the magazine.

57. In an automatic phonograph, a frame, a vertical spindle, a horizontal floating disk loosely fitting the spindle, a magazine journaled on the frame for turning around a horizontal axis and provided peripherally with spaced bearings having spring-actuated dogs, a shaft journaled in said bearings provided with plates having diametrically opposite notches for engagement at different times by the respective dogs, a bracket secured upon the shaft for movement approximately radially of the magazine, a sleeve journaled on the bracket and extending radially of the shaft, a pair of opposite-bowed grippers pivoted at diametrically opposite points to the sleeve, a spring connecting the free ends of the grippers for clamping them upon the periphery of an interposed playing record, means to turn the magazine to dispose the pivoted ends of the grippers in a plane above that of the floating disk, means to pivotally operate the bracket to dispose the grippers and record above the floating disk, and means to reverse the rotation of the magazine to lower the grippers and to fit the record on the spindle and flatly on the disk.

58. In an automatic phonograph, a frame, a vertical spindle, a horizontal floating disk loosely fitting the spindle, a magazine journaled on the frame for turning around a horizontal axis, and provided peripherally with spaced bearings having spring-actuated dogs, shafts journaled in said bearings provided with plates having diametrically opposite notches for engagement at different times by the respective dogs, a bracket secured upon the shaft for movement approximately radially of the magazine, a sleeve journaled on the bracket and extending radially of said shaft, a pair of oppositely-bowed grippers pivoted at diametrically opposite points to the sleeve, a spring connecting the free ends of the grippers for clamping them upon the periphery of an interposed playing record, means to turn the magazine to dispose the pivoted ends of the grippers in a plane above that of the floating disk, means to pivotally operate the bracket to dispose the grippers and record above the floating disk, means to reverse the rotation of the magazine to lower the grippers and to fit the record on the spindle and flatly on the disk, and means to cause the grippers to release the disk.

59. In an automatic phonograph, a frame, a vertical spindle, a horizontal floating disk loosely fitting the spindle, a magazine journaled on the frame for turning around a horizontal axis, and provided peripherally with spaced bearings having spring-actuated dogs, shafts journaled in said bearings provided with plates having diametrically opposite notches for engagement at different times by the respective dogs, a bracket secured upon the shaft for movement approximately radially of the magazine, a sleeve journaled on the bracket and extending radially of said shaft, a pair of oppositely-bowed grippers pivoted at diametrically opposite points to the sleeve, a spring connecting the free ends of the grippers for clamping them upon the periphery of an interposed playing record, means to turn the magazine to dispose the pivoted ends of the grippers in a plane above that of the floating disk, means to pivotally operate the bracket to dispose the grippers and record above the floating disk, means to reverse the rotation of the magazine to lower the grippers and to fit the record on the spindle and flatly on the disk, means to cause the grippers to release the disk, and means to lower the disk.

60. In an automatic phonograph, a frame, an intermittently operating rotary magazine thereon, a rock shaft journaled on the magazine, latching means to secure the shaft at the two extremes of its rocking movement, a plate on the shaft and a lug on the magazine to positively limit rocking movement of the shaft in one direction, and cam-actuated means to rock the shaft when the magazine is stationary until arrested by engagement with the lug on the magazine.

61. In an automatic phonograph, a frame, an intermittently operating rotary magazine thereon, a rock shaft journaled on the magazine, latching means to secure the shaft at the two extremes of its rocking movement, a plate on the shaft and a lug on the magazine to positively limit rocking movement of the shaft in one direction, cam-actuated means to rock the shaft when the magazine is stationary until arrested by the engagement of the lug and the magazine, a record support carried by and rotatable relative to the said shaft, a segmental gear journaled on the record support and intergeared therewith and provided with a projection, and a projection on the frame to be encountered through rotation of the magazine, by the said projection of the segmental gear to cause the latter to invert the record support.

62. In an automatic phonograph, a frame, an intermittently operating rotary magazine thereon, a rock shaft journaled on the magazine, latching means to secure the shaft at the two extremes of its rocking movement, a plate on the shaft and a lug on the magazine, to positively limit rocking movement of the shaft in one direction, cam-actuated means to rock the shaft when the magazine is stationary until arrested by the engagement of the lug and magazine, a record support carried by and rotatable relative to the said shaft and provided with a projecting portion, a segmental gear journaled on the record support and intergeared therewith and provided with a projection, a pair of projections on the frame to be encountered by the segmental gear projection to turn the said gear to invert the record support under one step of the magazine and the other to be encountered in further rotative movement of the magazine, by the projecting portion of the record support to cause the rock shaft to turn and the record support to swing in a direction to dispose a disk record in a radial position within the magazine.

63. In an automatic phonograph, a pivotally supported record carrier comprising a shaft having an arm projecting radially, a sleeve journaled on said arm and provided with diametrically-opposite notches, a pair of diametrically opposite grippers pivoted to the sleeve, a gear wheel journaled on the sleeve, and a spring-actuated pawl on the gear wheel and adapted under turning movement of the gear wheel in one direction to engage one of said notches and turn the sleeve and under reverse operation of the gear wheel, to engage the other of said notches.

64. In an automatic phonograph, a driven shaft, a clutch member rotatable with and slidable on said shaft, a clutch member journaled on said shaft, a shaft in geared relation to the journaled clutch member, means to effect partial engagement between the clutch members to effect rotation of the second shaft, and means actuated by the latter to effect full engagement between the clutch members.

65. In an automatic phonograph, a driven shaft, a clutch member rotatable with and slidable on said shaft, a clutch member journaled on said shaft, a shaft in geared relation to the journaled clutch member, means to effect partial engagement between the clutch members to effect rotation of the second shaft, means actuated by the latter to effect full engagement between the clutch members, and means to reverse the action of the cam-actuated means to disengage the clutch members.

66. In an automatic phonograph, a driven shaft, a turntable geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving groove inward of the playing groove to effect a special movement of the tone arm, a plate movable with the tone arm to trip said rock-shaft from latching engagement with said lever, and means to effect such engagement between said lever and slidable clutch member as to cause the latter to partially clutch and operate the journaled clutch member to turn the second shaft.

67. In an automatic phonograph, a driven shaft, a turn-table geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving grooove inward of the playing groove to effect a special movement of the tone arm, a plate movable with the tone arm to trip said rock-shaft from latching engagement with said lever, means to effect such engagement between said lever and slidable clutch member as to cause the latter to partially clutch and operate the journaled clutch member to turn the second shaft, a yoke-lever engaging the slidable clutch member, a cam on the second shaft to cause the yoke to swing and effect full engagement between the clutch members and restore said lever to latched relation to the rock-shaft.

68. In an automatic phonograph, a drive shaft, a turntable geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving groove inward of the playing groove to effect a special movement of the tone arm, a plate movable with the tone arm to trip said rock-shaft from latching engagement with said lever, means to effect such engagement between said lever and slidable clutch members as to cause the latter to partially clutch and operate the journaled clutch member to turn the second shaft, a yoke-lever engaging the slidable clutch member, a cam on the second shaft to cause the yoke to swing and effect full engagement between the clutch members and restore said lever to latched relation to the rock-shaft, and means to reverse the operation of the yoke-lever to disengage the clutch members, as the cam pressure on the yoke-lever ends.

69. In an automatic phonograph, a drive shaft, a turntable geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving groove inward of the playing groove to effect a special movement of the tone arm, a plate movable with the tone arm to trip said rock-shaft from latching engagement with said lever, means to effect such engagement between said lever and slidable clutch member as to cause the latter to partially clutch and operate the journaled clutch member to turn the second shaft, a yoke-lever engaging the slidable clutch member, a cam on the second shaft to cause the yoke to swing and effect full engagement between the clutch members and restore said lever to latched relation to the rock-shaft, means to reverse the operation of the yoke-lever to disengage the clutch members, as the cam pressure on the yoke-lever ends, a second cam on said second shaft, and means actuated thereby to tilt the tone arm to raise the needle from the record.

70. In an automatic phonograph, a drive shaft, a turn-table geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving groove inward of the playing groove to effect a special movement of the tone arm, a plate movable with the tone arm to trip said rock-shaft from latching engagement with said lever, means to effect such engagement between said lever and slidable clutch member as to cause the latter to partially clutch and operate the journaled clutch member to turn the second shaft, a yoke-lever engaging the slidable clutch member, a cam on the second shaft to cause the yoke to swing and effect full engagement between the clutch members and restore said lever to latched relation to the rock-shaft, means to reverse the operation of the yoke-lever to disengage the clutch members as the cam pressure on the yoke-lever ends, a second cam on said second shaft, means actuated thereby to tilt the tone arm to raise the needle from the record, a third cam on said second shaft, and means actuated thereby to swing the tilted tone arm until the needle is beyond the peripheral plane of the record.

71. In an automatic phonograph, a drive shaft, a turn-table geared thereto, a playing record carrying disk upon and revolved by the turntable, a pair of clutch members on the driven shaft one rotatable with and slidable on the shaft and the other journaled on the shaft, a second shaft geared to the journaled clutch member, a rock-shaft, a lever latched in inoperative position by the rock-shaft, a tone arm having a needle engaging the playing record, said record having a needle-receiving groove inward of the playing groove to effect a special movement of the tone arm, a plate movable with the tone arm to trip said rock-shaft from latching engagement with said lever, means to effect such engagement between said lever and slidable clutch member as to cause the latter to partially clutch and operate the journaled clutch member to turn the second shaft, a yoke-lever engaging the slidable clutch member, a cam on the second shaft to cause the yoke to swing and effect full engagement between the clutch members and restore said lever to latched relation to the rock-shaft, means to reverse the operation of the yoke-lever to disengage the clutch members as the cam pressure on the yoke-lever ends, a second cam on said second shaft, means actuated thereby to tilt the tone arm to raise the needle from the record, a third cam on said second shaft, means actuated thereby to swing the tilted tone arm until the needle is beyond the peripheral plane of the record, a fourth cam on said second shaft, and means actuated thereby to lift the playing record-carrying disk off the turntable.

72. In an automatic phonograph, a shaft for making full revolutions intermittently, a second shaft geared thereto for simultaneously turning half revolutions, a set of three shafts, one for manual adjustment rotatably, a lever on one of the other of said set of three shafts for operation at times by the cam of the full-revolution shaft and provided with two catch shoulders, a pair of levers on the third of said set of three shafts for respective operation by the cams of the half-revolution shaft, and each provided with a catch shoulder, a latch to engage the catch shoulder of each lever for operation by the respective cam of the half-revolution shaft to hold the respective lever in an unresponsive position relative to its respective cam, a latch to engage either of the latch shoulders of the lever for operation by the cam of the full-revolution shaft, a pair of plates on the manually-adjustable shaft provided with star points for tripping the respective latches from engagement with the shoulders of the levers for operation by the respective cams, of the half-revolution shaft, and a third plate on the manually-operable shaft provided with two star points of unequal length, the shorter one for tripping the respective latch from one shoulder to permit the respective cam to operate the lever half of its full stroke and the other for tripping the said latch sufficiently to free the lever so that the cam can effect a full stroke of said lever.

73. In an automatic phonograph, a shaft for making full revolutions intermittently, a second shaft geared thereto for simultaneously turning half revolutions, cams on said shafts, a set of three shafts, one for manual adjustment rotatably, a lever on one of the other of said set of three shafts for operation at times by the cam of the full-revolutions shaft and provided with two catch shoulders, a pair of levers on the third of said set of three shafts for respective operation by the cams of the half-revolution shaft, and each provided with a catch shoulder, a latch to engage the catch shoulder of each lever for operation by the respective cam of the half-revolution shaft to hold the respective lever in an unresponsive position relative to its respective cam, a latch to engage either of the latch shoulders of the lever for operation by the cam of the full-revolution shaft, a pair of plates on the manually adjustable shaft provided with star points for tripping the respective latches from engagement with the shoulders of the levers for operation by the respective cams of the half revolution shaft, and a third plate on the manually-operable shaft provided with two star points of unequal length, the shorter one for tripping the respective latch from one shoulder to permit the respective cam to operate the lever half of its full stroke and the other for tripping the said latch sufficiently to free the lever so that the cam can effect a full stroke of said lever, and latch means to secure the manually-adjustable shaft against accidental rotation.

74. In an automatic phonograph, a frame, a rotatable magazine thereon, three ratchet wheels rotatable coaxially with the magazine, coaxially journaled brackets adjacent respective ratchet wheels, spring-actuated pawls on the brackets and engaging said ratchet wheels to cause each to impart intermittent rotation in the same direction to the magazine, a pair of intermittently-operated shafts, a cam on one and two cams on the other of said shafts, levers for actuation by said cams to cause the respective pawls to effect rotation in the same direction to the magazine, and springs tending to force the levers into the paths of the respective cams.

75. In an automatic phonograph, a frame, a rotatable magazine thereon, three ratchet wheels rotatable coaxially with the magazine, coaxially journaled brackets adjacent respective ratchet wheels, spring-actuated pawls on the brackets and engaging said ratchet wheels to cause each to impart intermittent rotation in the same direction to the magazine, a pair of intermittently-operated shafts, a cam on one and two cams on the other of said shafts, levers for actuation by said cams to cause the respective pawls to effect rotation in the same direction of the magazine, springs tending to force the levers into the paths of the respective cams, and independent means for holding the respective levers against the resistance of said springs, in positions irresponsive to said respective cams.

76. In an automatic phonograph, a frame, a driven shaft thereon, a pair of pivoted bowed grippers, a spring for clamping them upon opposite edges of a playing record, a pair of intergeared shafts journaled on the frame and provided with arms projecting between and engaging the ends of the grippers, and cam-actuated means to impart spreading action to said arms to disengage the grippers from the record.

77. In an automatic phonograph, a horizontally oscillatory support, a tone arm mounted thereon and movable therewith and pivoted thereon to move in a vertical direction and provided with a depending tail lever, an angle lever on the tone arm support and between the same and said tail piece, a spring applying pressure on the lever to permit the tone arm to tilt downward for the depression of its outer or free end and a lever for automatic operation to apply pressure on the said angle lever and overcome the force of said spring to effect the raising of the free end of the tone arm.

78. In an automatic phonograph, a horizontally oscillatory support, a tone arm mounted thereon and movable therewith and pivoted thereon to move in a vertical direction and provided with a depending tail lever, an angle lever on the tone arm support and between the same and said tail lever, a spring applying pressure on the lever to permit the tone arm to tilt downward for the depression of its outer or free end, and cam-actuated means for rocking said angle lever to tilt the tone arm for the elevation of the free end thereof.

79. In an automatic phonograph, a frame, a magazine journaled thereon to rotate around a horizontal axis, a ratchet wheel coaxially of and rotatable with the magazine, a bracket bearing a journaled relation to the magazine, a pawl pivoted thereon, a knuckle pivoted to the bracket, a rod for abutting endwise against the bracket and provided with a reduced end slidingly fitting the knuckle, a retractile spring connecting the rod and frame and exerting force tending to resist separating movement between the rod and knuckle, a retractile spring connecting the rod and bracket, and means, when the first-named spring has rotated the bracket, to cause such engagement between the frame and pawl as to raise the latter clear of the ratchet wheel.

WILLIAM T. CARNES.